(12) United States Patent
Matsunaga

(10) Patent No.: US 6,552,998 B1
(45) Date of Patent: Apr. 22, 2003

(54) TWO-WAY COMMUNICATION SYSTEM, AND DELAY AND TRANSMISSION LEVEL METHODS

(75) Inventor: Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/055,272

(22) Filed: Apr. 6, 1998

(30) Foreign Application Priority Data

Apr. 4, 1997 (JP) .............................................. 9-087056

(51) Int. Cl.[7] ........................ G01R 31/08; G08C 15/00; H04J 3/14; H04L 1/22
(52) U.S. Cl. ....................... 370/228; 370/216; 370/227; 340/825.01
(58) Field of Search ................................ 370/216, 225, 370/228, 242, 244, 249, 282, 294, 498, 503, 508, 509, 517, 519, 217, 221–223, 227; 340/825, 825.01, 2.1, 3.2, 3.43

(56) References Cited

U.S. PATENT DOCUMENTS

| | | | | |
|---|---|---|---|---|
| 4,769,807 A | * | 9/1988 | Niwa et al. .................. | 370/224 |
| 5,003,531 A | * | 3/1991 | Farinholt et al. ...... | 340/825.01 |
| 5,317,571 A | * | 5/1994 | Marcel et al. ............... | 370/508 |
| 5,357,360 A | * | 10/1994 | Imhoff et al. ................ | 359/110 |
| 5,414,414 A | * | 5/1995 | Suzuki ........................ | 340/2.1 |
| 5,539,564 A | * | 7/1996 | Kumozaki et al. ........... | 359/137 |
| 5,818,825 A | * | 10/1998 | Corrigan et al. ............ | 370/329 |
| 5,835,483 A | * | 11/1998 | Bisson ................... | 340/825.01 |
| 5,870,403 A | * | 2/1999 | Egoshi ........................ | 370/228 |
| 5,898,697 A | * | 4/1999 | Hurme et al. ................ | 370/508 |
| 6,275,468 B1 | * | 8/2001 | Burke et al. ................. | 370/222 |

FOREIGN PATENT DOCUMENTS

| | | |
|---|---|---|
| JP | 61-39787 | 2/1986 |
| JP | 63-200637 | 8/1988 |
| JP | 02-312416 | 12/1990 |
| JP | 04-299278 | 10/1992 |
| JP | 05-153167 | 6/1993 |
| JP | 05-336087 | 12/1993 |
| JP | 08-037657 | 2/1996 |
| WO | WO 97/03508 | 1/1997 |

* cited by examiner

Primary Examiner—Hassan Kizou
Assistant Examiner—David Odland
(74) Attorney, Agent, or Firm—Sughrue Mion, PLLC

(57) ABSTRACT

A two-way communication system that can shorten the system recovery time when a link switching operation between a center station and a relay station occurs over two-way CATV networks, passive optical star networks and the like. A center station measures the round-trip propagation delay of a signal when a subscriber station starts its operation and then sets the transmission delay of the subscriber station so as to equalize the round-trip propagation delay to a fixed system delay. When a link switching operation occurs from a working system to a standby system, the center station measures the round-trip propagation delay of a signal for a subscriber station after the link switching operation and then resets transmission delays of all subscriber stations connected to the relay station to a time based on the difference between the measured delay and the round-trip propagation delay of a signal before the link switching operation.

16 Claims, 24 Drawing Sheets

TWO-WAY COMMUNICATION SYSTEM, AND DELAY AND TRANSMISSION LEVEL METHODS

BACKGROUND OF THE INVENTION

The present invention relates to a two-way communication system that adjusts a transmission delay or transmission level when a subscriber station starts its operation over, for example, a two-way CATV network or passive optical star network, and more particularly to a delay or transmission level setting method suitable at a transmission link switching time in a two-way communication system. Moreover, the present invention relates to a delay setting method and a transmission level setting method suitble for two-way communication systems.

In conventional time division multiplex communication systems such as two-way CATV networks, passive optical star networks, or the like, since subscriber stations are respectively located at different distances from a center station, variations occur in the receive timings and the receive signal levels of up-stream signals received by the center station. In order to avoid such a problem, a respective transmission delay is set to each subscriber station by measuring the round-trip propagation delay time between a subscriber station and the center station when the subscriber station starts its operation.

By previously setting respective transmission delays to subscriber stations, the center station can receive up-stream signals transmitted from different subscriber stations at short intervals. In other words, the network transmission efficiency can be improved.

A typical prior-art time division multiplex communication system is disclosed, for example, in JP-A-299278/1992. According to the prior art, a subscriber station first receives a round-trip propagation delay measurement signal transmitted from a center station and then sends back an echo signal to the center station. The center station measures an interval between the time a measurement signal is transmitted and the time an echo signal is received, that is a round-trip propagation delay time.

Variations in the level of an up-stream signal received by a center station restrict the maximum laying distance and the configuration of relay equipment of the network because of the limited receivable signal level of the center station. For that reason, the requirement for receive signal levels is relieved by measuring the receive signal level in the center station when a subscriber station starts to operate and then adjusting it to a constant level.

JP-A-39787/1986, for example, discloses the prior-art level measuring method in which the center station measures the receive level of an echo signal.

In the above-mentioned prior art, where the distance between the center station and a subscriber station is long, a relay station is installed for signal transmission in the middle of the transmission line. In this case, the center station is connected to a relay station via a relay transmission line such as an optical fiber or a coaxial cable. In most cases, the relay transmission line is duplex systematized by a working system and a stand-by system in preparation for a failure of a network. If the relay transmission line is switched to the stand-by system because of a link failure in the relay transmission line in a working system, it is needed to reset the transmission delays or transmission level set amounts of all subscriber stations connected to the relay station.

The number of subscriber stations connected to one relay station depends on the network. However, in the case of the two-way CATV network, the maximum number of subscriber stations is estimated to be about 1000. In order to reset the delay or transmission level, the measurement signal and the measurement response signal must be transmitted and received to respective subscriber stations several times.

Therefore, when a link switching operation occurs in a relay transmission line, resetting respectively the delay or transmission level to each subscriber station very prolongs a failure recovery time of the system.

SUMMARY OF THE INVENTION

The present invention is made to solve the abovementioned problems in the prior art. The objective of the present invention is to provide a two-way communication system that can improve the shorten the system recovery time by adjusting the transmission delay or transmission level before an operation of a subscriber station and shortening the system recovery time when a link switching operation between a center station and a relay station occurs, over two-way CATV networks, passive optical star networks and the like.

Another objective of the present invention is to provide a method of setting a delay in a center station that can improve the shorten the system recovery time.

Further objective of the present invention is to provide a method of setting a transmisson level in a center station that can improve the shorten the system recovery time.

In order to achieve the above-mentioned problems, according to the present invention defined in claim 1, a two-way communication system comprises a center station, subscriber stations each for mutually exchanging signals with the center station, a relay station for relaying signals between the center station and the subscriber stations, a relay transmission line connected between the center station and the relay station and duplex systematized by a working system and a stand-by system, and a subscriber transmission line connected between the relay station and the subscriber stations, wherein the center station measures a round-trip propagation delay when a subscriber station starts its operation and then sets a transmission delay of said subscriber station so as to equalize the round-trip propagation delay measured to said subscriber station to a fixed system delay, and wherein the center station measures a round-trip propagation delay of a subscriber station after a link switching operation when a link switching operation from a working system to a stand-by system occurs due to a failure in the relay transmission line, and resets transmission delays of all subscriber stations connected to the relay station at a time based on a difference between the measured delay and a round-trip propagation delay of a signal to the subscriber station before the link switching operation.

According to the two-way communication system of claim 2, the center station is connected to plural relay stations via plural relay transmission lines; and all subscriber stations connected to the plural relay stations share a line based on a time division multiplex system; and when a link switching operation from the working system to the stand-by system occurs due to a failure of one of the plural relay transmission lines or when a link switching operation from the stand-by system to the working station occurs due to a recovery of a failed one of said plural relay transmission lines, the center station measures a round-trip propagation delay of a signal to a subscriber station connected to the relay station involved in the link switching operation and resets round-trip propagation delays of all subscriber stations connected to the relay station involved in the link switching operation at a time, based on the difference between the measured delay and a round-trip propagation delay to the subscriber station before the link switching operation.

According to the present invention defined in claim 3, a two-way communication system comprises a center station, subscriber stations each for mutually exchanging signals with the center station, a relay station for relaying signals between the center station and the subscriber stations, a relay transmission line connected between the center station and the relay station and duplex systematized by a working system and a stand-by system, and a subscriber transmission line connected between the relay station and the subscriber stations, wherein the center station measures a round-trip propagation delay when a subscriber station starts its operation and then sets a transmission delay of the subscriber station so as to equalize the round-trip propagation delay measured to the subscriber station to a fixed system delay; and wherein the center station measures a round-trip propagation delay of a signal to the relay station when the relay station starts its operation; and wherein when a link switching operation from the working system to the stand-by system occurs due to a failure of the relay transmission line or when a link switching operation from the stand-by system to the working system occurs due to a recovery of a failed relay transmission line, the center station measures a round-trip propagation delay of a signal to the relay station after the link switching operation and then resets transmission delays of all subscriber stations connected to the relay station at a time, based on a difference the measured delay and a round-trip propagation delay to a signal to the relay station before the link switching operation.

According to the two-way communication system of claim 4, the center station is connected to plural relay stations via plural relay transmission lines; and all subscriber stations connected to the plural relay stations share a line by a time division multiplex system; and when a link selecting operation from the working system to the standby system occurs due to a failure of one of the plural relay transmission lines or when a link switching operation from the stand-by system to the working system occurs due to a recovery of a failed one of said plural relay transmission lines, the center station measures a round-trip propagation delay of a signal to a relay station involved in the link switching operation and resets transmission delays of all the subscriber stations connected to the relay station involved in the link switching operation, based on the difference between the measured delay and a round-trip propagation delay of a signal to the relay station before the link switching operation.

According to the two-way communication system of claim 5, the transmission delay of the relay station is set so as to equalize the round-trip propagation delay measured to the relay station to a relay station system delay of a fixed value; and when a link switching operation from the working system to the stand-by station occurs due to a failure of the relay transmission line, or when a link switching operation from the stand-by system to the working system occurs due to a recovery of a failed relay transmission line, the center station measures a round-trip propagation delay of a signal to the relay station after the link switching operation and then resets the transmission delay of the relay station so as to equalize transmission delays of all subscriber stations connected to the relay station to those before a link switching operation based on the difference between the measured round-trip propagation delay and a round-trip propagation delay of a signal to the relay station before the link switching operation.

According to the two-way communication system of claim 6, the center station is connected to plural relay stations via plural relay transmission lines; and all subscriber stations connected to the plural relay stations share a line based on a time division multiplex system; and when a link switching operation from the working system to the stand-by system occurs due to a failure of one of said plural relay transmission lines or when a link switching operation from the stand-by system to the working system occurs due to a recovery of a failed one of the plural relay transmission lines, the center station measures a round-trip propagation delay of a signal to the relay station after the link switching operation and resets the transmission delay of the relay station involved in the link switching operation so as to equalize transmission delays of all the subscriber stations connected to the relay station involved in the link switching operation to the transmission delay before the link switching operation, based on the difference between the measured round-trip propagation delay and the round-trip propagation delay of a signal to the relay station before the link switching operation.

According to the present invention defined in claim 7, a two-way communication system comprises a center station, subscriber stations each for mutually exchanging signals with the center station, a relay station for relaying signals between the center station and the subscriber stations, a relay transmission line connected between the center station and the relay station and duplex systematized by a working system and a stand-by system, and a subscriber transmission line connected between the relay station and the subscriber stations, wherein the center station measures a receive level when a subscriber station starts its operation and then sets the transmission level of the subscriber station so as to equalize the receive level measured to the subscriber station to a fixed system receive level; and wherein when a link switching operation from the working system to the stand-by system occurs due to a failure of the relay transmission line or when a link switching operation from the stand-by system to the working system occurs due to a recovery of a failed relay transmission line, the center station resets transmission level set values of all subscriber stations connected to the relay station at a time, based on a difference between the measured receive level and a receive level of a signal to a subscriber station after the link switching operation.

According to the two-way communication system of claim 8, the center station is connected to plural relay stations via plural relay transmission lines; and all subscriber stations connected to the plural relay stations share a line based on a time division multiplex system; and when the link switching operation from the working system to the stand-by system occurs due to a failure of one of the plural relay transmission lines or when a link switching operation from the stand-by system to the working station occurs due to a recovery of a failed one of the plural relay transmission lines, the center station measures a receive level of a signal to a subscriber station connected to a relay station involved in the link switching operation and resets transmission levels of all subscriber stations connected to the relay station involved in the link switching operation at a time, based on a difference between the measured receive level and a receive level of a signal to the subscriber station before the link switching operation.

According to the present invention defined in claim 9, a two-way communication system comprises a center station, subscriber stations each for mutually exchanging signals with the center station, a relay station for relaying signals between the center station and the subscriber stations, a relay transmission line connected between the center station and the relay station and duplex systematized by a working system and a stand-by system, and a subscriber transmission line connected between the relay station and the subscriber stations, wherein the center station measures a receive level when a subscriber station starts its operation and then sets the transmission level of the subscriber station so as to equalize the receive level measured to the subscriber station to a fixed system receive level; wherein said center station measures a receive level of a signal to said relay station when said relay station starts its operation; and wherein when a link switching operation from the working system to the stand-by system occurs due to a failure of the relay transmission line or when a link switching operation from the stand-by system to the working system occurs due to a recovery of a failed relay transmission line, the center station measures a receive level of a signal to the relay station after the link switching operation and then resets transmission level set values of all subscriber stations connected to the relay station at a time, based on a difference between the measured receive level and a receive level of a signal to the subscriber station after the link switching operation.

According to the two-way communication system of claim 10, the center station is connected to plural relay stations via plural relay transmission lines; and all subscriber stations connected to the plural relay stations share a line based on a time division multiplex system; and when a link switching operation from the working system to the stand-by system occurs due to a failure of one of the plural relay transmission lines or when a link switching operation from the stand-by system to the working station occurs due to a recovery of a failed one of the plural relay transmission lines, the center station measures a receive level of a signal to a relay station involved in the link switching operation and then resets transmission level set values of all subscriber stations connected to the relay station involved in the link switching, based on a difference between the measured receive level and a receive level of a signal to the relay station before the link switching operation.

According to the two-way communication system of claim 11, the transmission level of the relay station is set so as to equalize the receive level of the signal measured to the relay station to a system receive level of a fixed value; and when a link switching operation from the working system to the stand-by system occurs due to a failure of a relay transmission line or when a link switching operation from the stand-by system to the working system occurs due to a recovery of a failed relay transmission line, the center station measures a receive level of a signal to a relay station after a link switching operation and then resets a transmission level set value of the relay station so as to equalize transmission levels of all subscriber stations connected to the relay station to the transmission level before the link switching operation, based on a difference between the measured receive level and a receive level of a signal to the relay station before the link switching operation.

According to the two-way communication system of claim 12, the center station is connected to plural relay stations via plural relay transmission lines; and all subscriber stations connected to the plural relay stations share a line based on a time division multiplex system; and when a link switching from the working system to the stand-by system occurs due to a failure of one of the plural relay transmission lines or when a link switching operation from the stand-by system to the working station occurs due to a recovery of a failed one of the plural relay transmission lines, the center station measures a receive level of a signal to a relay station after the link switching operation and then resets a transmission level set value of a relay station involved in the link switching operation so as to equalize transmission levels of all subscriber stations connected to the relay station to the transmission level before the link switching operation, based on a difference between the measured receive level and a receive level of a signal to the relay station before the link switching operation.

According to the present invention defined in claim 13, a method of setting a delay in a center station comprises the steps of measuring a round-trip propagation delay when a subscriber station starts its operation and then sets a transmission delay of the subscriber station so as to equalize the round-trip propagation delay measured to the subscriber station to a fixed system delay, measuring a round-trip propagation delay of a subscriber station after a link switching operation when a link switching operation from a working system to a stand-by system occurs due to a failure in a relay transmission line, and resetting transmission delays of all subscriber stations connected to said relay station at a time based on a difference between the measured delay and a round-trip propagation delay of a signal to the subscriber station before the link switching operation.

According to the present invention defined in claim 14, a method of setting a delay in a center station comprises the steps of measuring a round-trip propagation delay when a subscriber station starts its operation and then sets a transmission delay of the subscriber station so as to equalize the round-trip propagation delay measured to the subscriber station to a fixed system delay, measuring a round-trip propagation delay of a signal to a relay station when the relay station starts its operation, measuring a round-trip propagation delay of a signal to the relay station after the link switching operation when a link switching operation from a working system to a stand-by system occurs due to a failure of a relay transmission line or when a link switching operation from a stand-by system to the working system occurs due to a recovery of a failed relay transmission line, and then resetting transmission delays of all subscriber stations connected to the relay station at a time, based on a difference the measured delay and a round-trip propagation delay to a signal to the relay station before the link switching operation.

According to the present invention defined in claim 15, a method of setting a transmission level in a center station comprises the steps of measuring a receive level when a subscriber station starts its operation, setting the transmission level of the subscriber station so as to equalize the receive level measured to the subscriber station to a fixed system receive level, and resetting transmission level set values of all subscriber stations connected to the relay station at a time, based on a difference between the measured receive level and a receive level of a signal to a subscriber station after the link switching operation when a link switching operation from a working system to a stand-by system occurs due to a failure of a relay transmission line or when a link switching operation from the stand-by system to the working system occurs due to a recovery of a failed relay transmission line.

According to the present invention defined in claim 16, a method of setting a transmission level in a center station comprises the steps of measuring a receive level when a subscriber station starts its operation, setting the transmission level of the subscriber station so as to equalize the receive level measured to the subscriber station to a fixed system receive level, measuring a receive level of a signal to a relay station after the link switching operation when a link switching operation from a working system to a stand-by system occurs due to a failure of a relay transmission line or when a link switching operation from the stand-by system to the working system occurs due to a recovery of a failed relay transmission line, and then resetting transmission level set values of all subscriber stations connected to the relay station at a time, based on a difference between the measured receive level and a receive level of a signal to the subscriber station after the link switching operation.

As to the two-way communication system according to the present invention defined in claim 1, the center station measures a round-trip propagation delay when a subscriber station newly starts its operation and then internally registers a transmission delay set to the subscriber station. When the linking condition is switched from a working system to a stand-by system because of a failure in a relay transmission line connecting the center station to the relay station, or when the linking condition is switched from a stand-by system to a working system because of the recovery of a failed relay transmission line, the center station transmits a round-trip propagation delay measurement signal to an arbitrary subscriber station to newly obtain a round-trip propagation delay.

Successively, the center station calculates the difference between the round-trip propagation delay before a link switching operation and the round-trip propagation delay after a link switching operation and then updates the transmission delay by adding the difference to data on registered transmission delays of all subscriber stations connected to the relay station. After the updating of the transmission delay data, the center station transmits a transmission delay setting signal to all subscriber stations connected to the relay station to update the transmission delay of each subscriber station.

In such a manner, compared with the case where the transmission delay is reset for different subscriber stations, the system recovery time associated with a delay resetting operation can be shortened by detecting the difference between round-trip propagation delay amounts to a subscriber station at a link switching time and then updating the transmission delays of all subscriber stations accommodated by the relay station at a time.

In the two-way communication system according to the present invention defined in claim 2, the center station is connected to plural relay stations via relay transmission lines. When a link switching occurs because of a failure or recovery of one of the relay transmission lines, the center station selects an arbitrary subscriber station connected to the relay station involved in the link switching operation and then transmits a round-trip propagation delay measurement signal to it, thus obtaining a new round-trip propagation delay.

Thereafter, in a similar manner to that defined in claim 1, the difference of a round-trip propagation delay to a subscriber station connected to the relay station in a link switching state is detected and the transmission delays of all subscriber stations accommodated by the relay station are updated at a time. For that reason, the system recovery time associated with a delay resetting operation can be shortened, compared with the case where the round-trip propagation delay is re-measured to the subscriber stations connected all subscriber stations.

In the two-way communication system according to the present invention defined in claim 3, the center station measures the round-trip propagation delay of a signal when a subscriber station newly starts its operation and then internally registers the transmission delay set to the subscriber station.

The relay station has the function of transmitting an echo signal in response to the round-trip propagation delay measurement signal transmitted from the center station. When a link switching operation occurs due to a failure or recovery of the relay transmission line connecting the center station to the relay station, the center station transmits a round-trip propagation delay measurement signal to the relay station to obtain a new round-trip propagation delay.

Next, the center station calculates a difference between a round-trip propagation delay before a link switching operation and a round-trip propagation delay after the link switching operation to the relay station and then adds data on registered transmission delays of all subscriber stations accommodated by the relay station to update them. After the updating of data on the transmission delays, the center station transmits a transmission delay setting signal to each of the subscriber stations connected to the relay station and then updates the transmission delays in the subscriber stations.

In such an operation, compared with the case where a delay resetting operation is performed for different subscriber stations, the system recovery time associated with a delay resetting operation can be shortened by detecting the difference between the round-trip propagation delays from the relay station at a link switching operation and then updating the transmission delays of all subscriber stations accommodated by the relay station at a time.

In the two-way communication system according to the present invention defined in claim 4, the center station is connected to plural relay stations via relay transmission lines. When a link switching operation occurs because of a failure or recovery of one of the relay transmission lines, the center station transmits a round-trip propagation delay measurement signal to the relay station involved in a link switching operation, thus a round-trip propagation delay before a link switching operation and a round-trip propagation delay after the link switching operation to the relay station, updates data on the registered transmission delays of the relay station, and then transmits a transmission delay setting signal to the relay station. The relay station receives the transmission delay setting signal and then updates the internal transmission delay.

In such an operation, the system recovery time associated with a delay resetting operation can be shortened by setting the transmission delay of the subscriber station to a fixed value at a link switching operation and then updating the transmission delay of only the relay station.

In the two-way communication system according to the present invention defined in claim 6, the center station is connected to plural relay stations via relay transmission lines. When a link switching operation occurs because of a failure or recovery of one of the relay transmission lines, the center station transmits a round-trip propagation delay measurement signal to the relay station involved in the link switching operation, thus obtaining a new round-trip propagation delay.

Thereafter, in a similar manner to that defined in claim 5, the difference of a round-trip propagation delay to the obtaining a new round-trip propagation delay.

Thereafter, in a similar manner to that defined in claim 3, the difference of a round-trip propagation delay amount to the relay station involved in the link switching operation is detected and the transmission delays of all subscriber stations accommodated by the relay station are updated at a time. For that reason, the system recovery time associated with a delay resetting operation can be shortened, compared with the case where the round-trip propagation delay is re-measured to the subscriber stations connected all relay stations.

In the two-way communication system according to the present invention defined in claim 5, like the subscriber stations, the relay station has the function of adding a transmission delay. The center station measures the round-trip propagation delay of a signal to the relay station when the relay station newly starts its operation and then internally registers the transmission delay set to the relay station. When a link switching operation occurs because of a failure or recovery of the relay transmission line connecting the center station to the relay station, the center station transmits a round-trip propagation delay measurement signal to the relay station, thus obtaining a new round-trip propagation delay.

Next, the center station calculates a difference between relay station involved in the link switching operation is detected to update the transmission delay. For that reason, the system recovery time associated with a delay resetting operation can be shortened, compared with the case where the round-trip propagation delay is re-measured to all the relay stations.

In the two-way communication system according to the present invention defined in claim 7, the center station measures the receive level of a signal when a subscriber station newly starts its operation and then internally registers the transmission level set to the subscriber station. When a link switching operation occurs from the working system to the stand-by system because of a failure in a relay transmission line connecting the center station to the relay station, or when a link switching operation occurs from the stand-by system to the working system because of the recovery of a failure in the relay transmission line, the center station selects an arbitrary subscriber station and then transmits a level measurement signal to it, thus obtaining a new receive level.

Successively, the center station the difference between the receive level before a link switching operation and the receive level after the link switching operation to the relay station and then updates the previous transmission level by adding the difference to data on registered transmission levels of all subscriber stations connected to the relay station. After the updating of the transmission level data, the center station transmits a transmission level setting signal to all subscriber stations connected to the relay station to update the transmission level of each subscriber station.

In such a manner, compared with the case where the transmission level is reset for different subscriber stations, the system recovery time associated with a transmission level resetting operation can be shortened by detecting the difference between receive levels to a subscriber station at a link switching time and then updating the transmission levels of all subscriber stations accommodated by the relay station at a time.

In the two-way communication system according to the present invention defined in claim 8, the center station is connected to plural relay stations via relay transmission lines. When a link switching operation occurs because of a failure or recovery of one of the relay transmission lines, the center station selects an arbitrary subscriber station connected to the relay station involved in the link switching operation, and transmits a level measurement signal to it, thus obtaining a new receive level.

Thereafter, according to a similar procedure to that defined in claim 7, the difference of a receive level to an arbitrary subscriber station connected to the relay station involved in the link switching operation is detected to update data on the registered transmission levels of all subscriber stations accommodated by the relay station at a time. For that reason, the system recovery time associated with a transmission level resetting operation can be shortened, compared with the case where the receive level is re-measured to subscriber stations connected to all the relay stations.

In the two-way communication system according to the present invention defined in claim 9, the center station measures the receive level of a signal when a subscriber station newly starts its operation and then internally registers the transmission level set to the subscriber station.

The center station also measures the receive level of a signal when the relay station newly starts its operation and then internally holds the receive level of a signal to the relay station.

The relay station has the function of transmitting an echo signal in response to a level measurement signal transmitted from the center station. When a link switching operation occurs because of a failure or recovery of a relay transmission line connecting the center station to the relay station, the center station transmits a level measurement signal to the relay station, thus obtaining a new receive level.

Successively, the center station calculates the difference between the receive level before a link switching operation and the receive level after the link switching operation and then updates the previous transmission level by adding the difference to data on registered transmission levels of all subscriber stations accommodated by the relay station. After the updating of the transmission level data, the center station transmits the transmission level setting signal to subscriber stations connected to the relay station to update the transmission delay of each subscriber station.

In such a manner, compared with the case where the transmission level is reset for different subscriber stations, the system recovery time associated with a delay amount resetting operation can be shortened by detecting the difference between receive levels from the relay station at a link switching time and updating the transmission levels of all subscriber stations accommodated with the relay station at a time.

In the two-way communication system according to the present invention defined in claim 10, the center station is connected to plural relay stations via relay transmission lines. When a link switching operation occurs because of a failure or recovery of one of the relay transmission lines, the center station transmits a level measurement signal to the relay station related to a link switching operation, thus obtaining a new receive level.

Thereafter, according to a similar manner to that defined in claim 9, the difference of a receive level to the relay station involved in the link switching operation is detected to update the transmission levels of all subscriber stations accommodated by the relay station at a time. As a result, the system recovery time associated with a transmission level resetting operation can be shortened, compared with the case where the receive level is re-measured to subscriber stations connected to all the relay stations.

In the two-way communication system according to the present invention defined in claim 11, like each subscriber station, the relay station has the function of adjusting a transmission level. The center station measures the receive level of a signal to the relay station when the relay station newly starts its operation and then internally registers the transmission level set to the relay station. When a link switching operation occurs because of a failure or recovery of a relay transmission line connecting the center station to the relay station, the center station transmits a level measurement signal to the relay station, thus obtaining a new receive level.

Successively, the center station calculates the difference between the receive level before a link switching operation and the receive level after the link switching operation and then updates data on the registered transmission level of the relay station, and then transmits a transmission level setting signal to the relay station. The relay station also receives the transmission level setting signal and then updates the internal transmission level.

In such a manner, the system recovery time associated with a transmission level resetting operation can be shortened by setting the transmission level of each subscriber station at a link switching time to a fixed value and updating the transmission level to only the relay station.

In the two-way communication system according to the present invention defined in claim 12, the center station is connected to plural relay stations via relay transmission lines. When a link switching operation occurs because of a failure or recovery of one of the relay transmission lines, the center station transmits a level measurement signal to the relay station related to a link switching operation, thus obtaining a new receive level.

Thereafter, according to a similar procedure to that defined in claim 11, the difference of a receive level to the relay station related in the link switching operation is detected to update the transmission levels of all subscriber stations. As a result, the system recovery time associated with a transmission level resetting operation can be shortened, compared with the case where the receive level is re-measured to all the relay stations.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, embodiments of a two-way communication system according to the present invention will be described below in detail with reference to the attached drawings.

Figure 1:
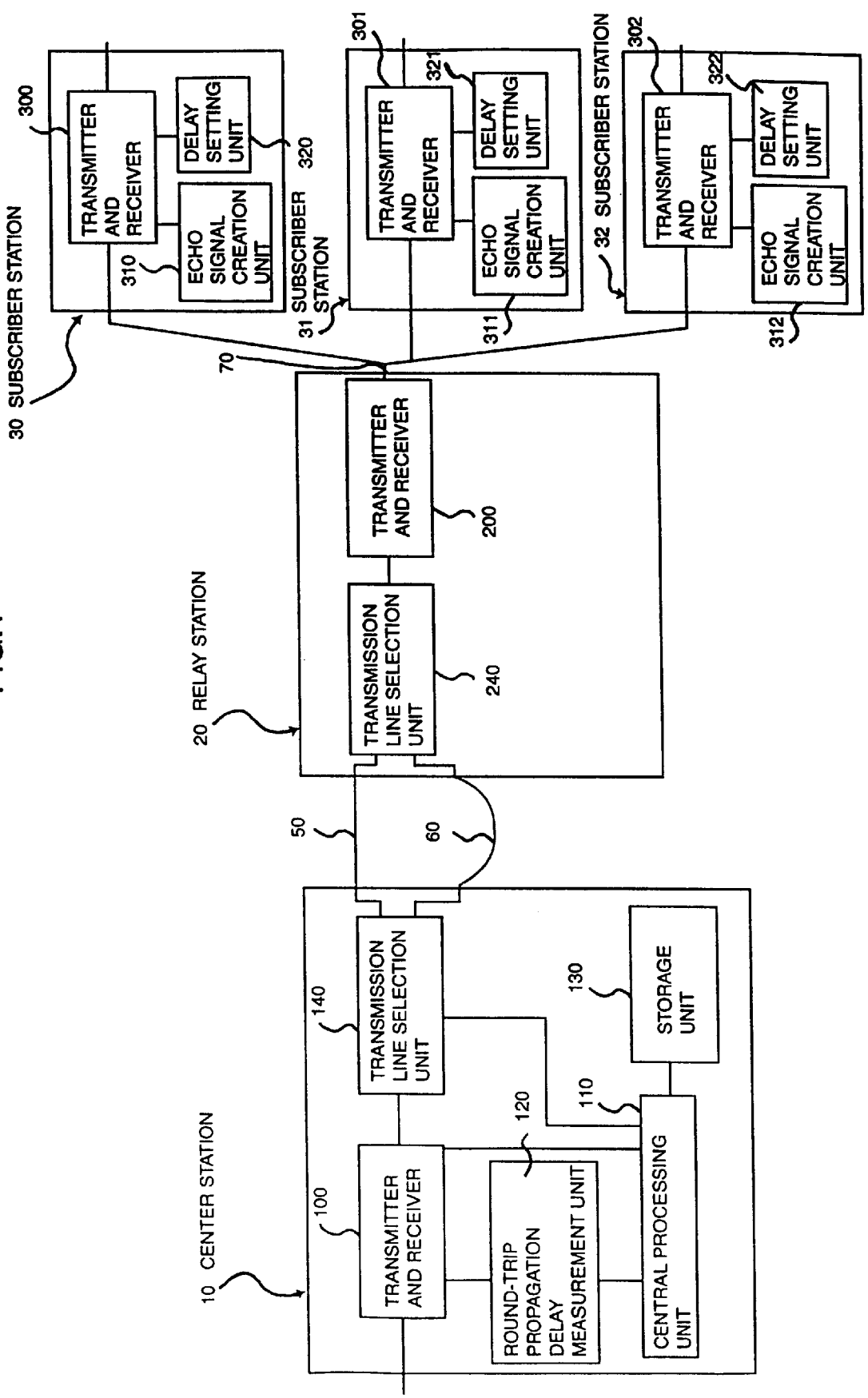
FIG. 1 is a block diagram illustrating the configuration of a two-way communication system for setting delays, according to a first embodiment of the present invention.

FIG. 1 is a block diagram showing the configuration of a two-way communication system, according to a first embodiment of the present invention.

According to the embodiment shown in FIG. 1, the system includes a center station 10, a relay station 20, and subscriber stations 30, 31 and 32. The center station 10 is connected to the relay station 20 via a working system relay transmission line 50 and a stand-by relay transmission line 60. The relay station 20 is connected to the subscriber stations 30 to 32 via the subscriber transmission line 70. The subscriber stations 30 to 32 share the up-stream line to transmit data from a subscriber station to the center station by the time division multiplex system.

The center station 10 consists of a tranceiver 100, a central processing unit 110, a round-trip propagation delay measurement unit 120, a storage unit 130, and a transmission line selection unit 140. The tranceiver 100 transmits and receives signals input to and output from external equipment such as exchanges or routers as well as signals input to and output from the transmission line selection unit 140. The tranceiver 100 also executes a process of multiplexing a main signal with a round-trip propagation delay measurement signal, an echo signal and a transmission delay setting signal and a process of separating a round-trip propagation delay measurement signal, an echo signal and a transmission delay setting signal from a main signal.

The central processing unit 110 creates a round-trip propagation delay measurement signal to output it to the tranceiver 100 and the round-trip propagation delay measurement unit 120. When receiving the round-trip propagation delays of the subscriber stations 30 to 32 from the round-trip propagation delay measurement device 120, the central processing unit 110 calculates the transmission delays for the subscriber stations 30 to 32 and then outputs them to the storage unit 130. The central processing unit 110 further creates a transmission delay setting signal and then it to the tranceiver 100.

In response to a round-trip propagation delay measurement signal from the central processing unit 110, the round-trip propagation delay measurement unit 120 measures the interval between the time the tranceiver 100 transmits a round-trip propagation delay measurement signal to each of the subscriber stations 30 to 32 and the time the tranceiver 100 receives an echo signal and then outputs the result as a round-trip propagation delay to the central processing unit 110.

The storage unit 130 stores the transmission delays to the working subscriber stations 30 to 32 in operation input from the central processing unit 110. The transmission line selection unit 140 monitors a failure in the transmission line 50 in a working station and the relay transmission line 60 in a stand-by station. When a failure occurs in the relay transmission line 50 in the working system, signals input from or output to the tranceiver 100 are switched from the relay transmission line 50 in the working system to the relay transmission line 60 in the stand-by system. When the relay transmission line 50 in the working system recovers from a failure, signals input to or output from the tranceiver 100 are switched from the relay transmission line 60 in the stand-by system to the relay transmission line 50 in the working system.

The relay station 20 consists of a tranceiver 200 and a transmission line selection unit 240. The tranceiver 200 relays an input signal from the transmission line selection unit 240 to the subscriber system transmission line 70 and relays an input signal from the subscriber system transmission line 70 to the transmission line selection unit 240. The function of the transmission line selection unit 240 is the same as that of the transmission line selection unit 140 in the center station.

The subscriber station 30 consists of a tranceiver 300, an echo signal creation unit 310, and a delay setting unit 320. The subscriber station 31 consists of a tranceiver 301, an echo signal creation unit 311, and a delay setting unit 321. The subscriber station 32 consists of a tranceiver 302, an echo signal creation unit 312, and a delay setting unit 322. Each of the tranceiver 300 to 302 transmits and receives signals to be exchanged with the subscriber transmission line 70 and signals to be exchanged with external equipment such as telephone sets or computers and executes a process of multiplexing a main signal with a round-trip propagation delay measurement signal, an echo signal and a transmission delay set signal and a process of separating a round-trip propagation delay measurement signal, an echo signal and a transmission delay set signal from a main signal.

The tranceiver 300 delays all signals to be transmitted to the center station based on the delay input from the delay setting unit 320. The tranceiver 301 delays all signals to be transmitted to the center station based on the delay input from the delay setting unit 321. The tranceiver 302 delays all signals to be transmitted to the center station based on the delay input from the delay setting unit 322. When receiving a round-trip propagation delay measurement signal from the tranceiver 300, the echo signal creating unit 310 immediately creates an echo signal and then sends back it to the tranceiver 300. When receiving a round-trip propagation delay measurement signal from the tranceiver 301, the echo signal creating unit 311 immediately creates an echo signal and then sends back it to the tranceiver 301. When receiving a round-trip propagation delay measurement signal from the tranceiver 302, the echo signal creating unit 312 immediately creates an echo signal and then sends back it to the tranceiver 302. The delay setting unit 320 outputs a transmission delay to the tranceiver 300 based on the transmission delay setting signal input from the tranceiver 300. The delay setting unit 321 outputs a transmission delay to the tranceiver 301 based on the transmission delay setting signal input from the tranceiver 301. The delay setting unit 322 outputs a transmission delay to the tranceiver 302 based on the transmission delay setting signal input from the tranceiver 302.

Figure 2:
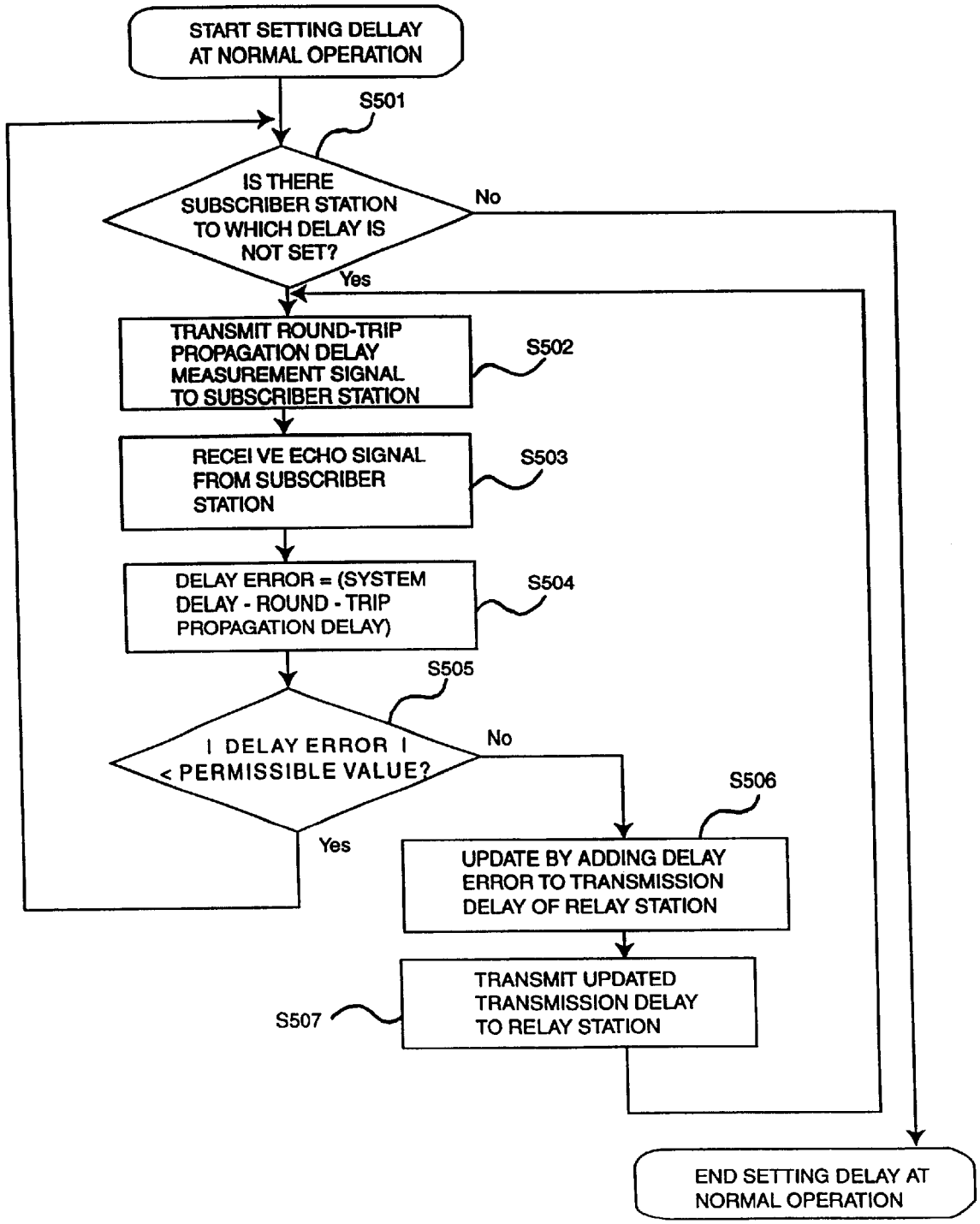
FIG. 2 is a flowchart illustrating the operational procedure of the center station for setting a delay at a normal operation time, according to the first embodiment.

FIG. 2 is a flowchart illustrating an operational procedure of the center station 10 for setting a delay at a normal operation time.

Referring to FIG. 2, when recognizing a subscriber station 30 in a delay non-set state which has newly started to operate, the central processing unit 110 in the center station 10 transmits a round-trip propagation delay measurement signal to the subscriber 30 while it activates the round-trip propagation delay measurement unit 120 (steps S501 and 502). In response to an echo signal from the subscriber station 30, the round-trip propagation delay measurement unit 120 stops its measurement operation (step S503). The interval between the time the round-trip propagation delay measurement signal is transmitted and the time an echo signal is received is referred to as a round-trip propagation delay amount.

The central processing unit 110 in the center station 10 internally holds the system delay. The system delay is a constant value which is set according to the round-trip propagation delay of a subscriber station located farthest in an assumed system including a stand-by system. The central processing unit 110 subtracts the round-trip propagation delay for the subscriber station 30 from the system delay to obtain a delay error (step S504).

When the delay error is more than a permissible value, it is updated by adding the delay error to the transmission delay of a subscriber station 30 stored in the storage unit 130 and then saves the result in the storage unit 130 (steps S505 and S506). The transmission delay is a delay time which is always added when the subscriber station 30 transmits a signal to the center station. The transmission delay is 0 when a subscriber station newly starts its operation.

Next, in order to update the transmission delay of the subscriber station 30, the central processing unit 110 creates and outputs a transmission delay setting signal to the tranceiver 100. Every time the central processing unit 110 ensures whether the delay has been accurately set, it creates and outputs a round-trip propagation delay measurement signal for the subscriber station 30 to the tranceiver 100 (step S507).

On the other hand, when the delay error is less than a permissible value, the delay setting to the subscriber station 30 ends (steps S505 and S501). After this operation, the same procedure is repeated until no subscriber stations to which a delay is not set exist.

Figure 3:
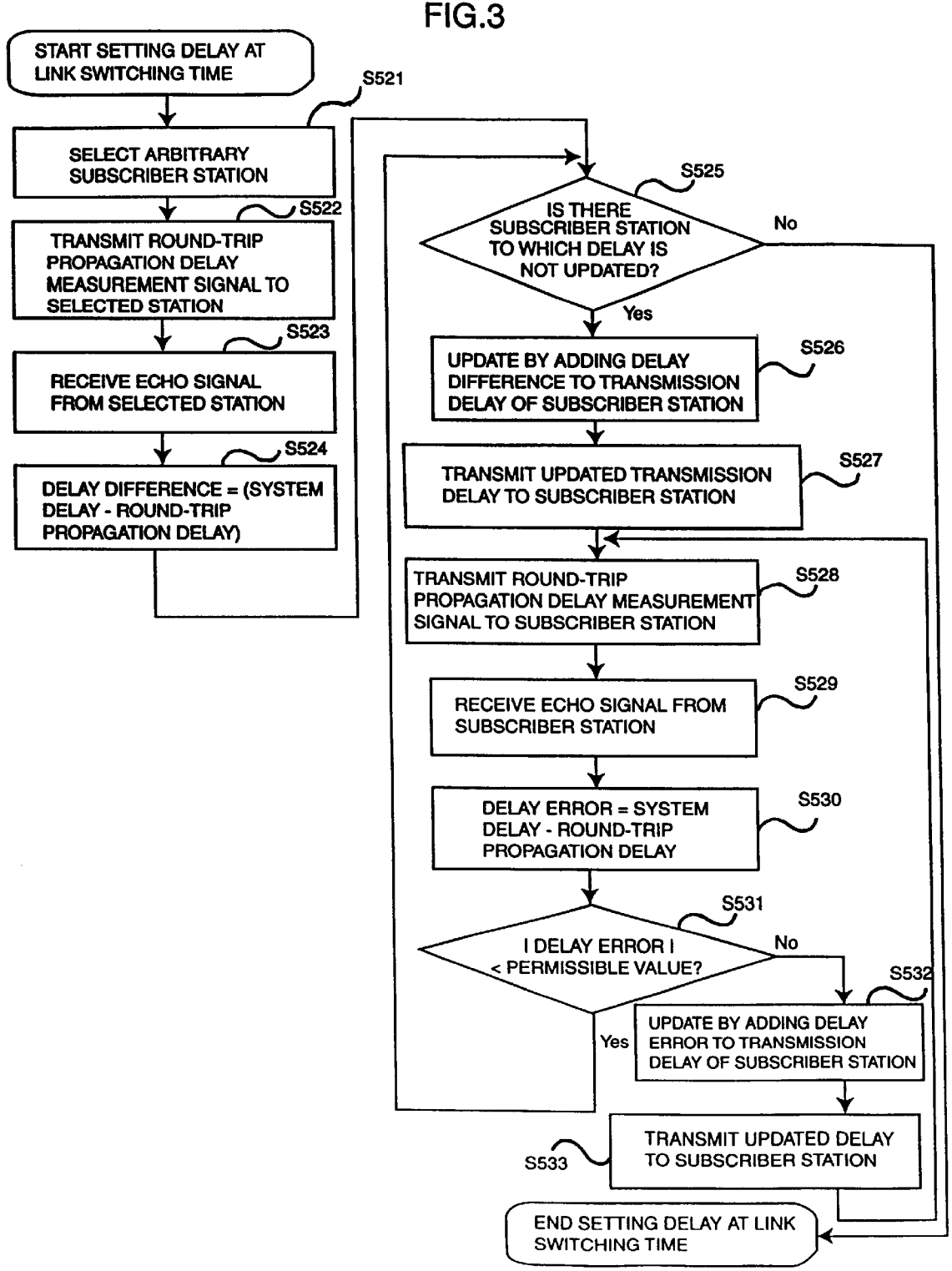
FIG. 3 is a flowchart illustrating the operational procedure of the center station for setting a delay at a link switching time, according to the first embodiment.

FIG. 3 is a flowchart illustrating the operational procedure of the center station 10 for setting a delay at a link switching time in the first embodiment.

In the center station 10, when switching an I/O signal from the working system relay transmission line 50 to the stand-by relay transmission line 60, the transmission line selection unit 140 notifies the central processing unit 110 of the occurrence of a link switching. The central processing unit 110 first selects a given subscriber station connected to the relay station 20 (step S521). If the subscriber station 30 is selected, the central processing unit 110 creates a round-trip propagation delay measurement signal for the selected subscriber station 30 and then transmits it to the subscriber station 30 via the tranceiver 100 (step S522).

When receiving an echo signal from the subscriber station 30, the tranceiver 100 in the center station 10 notifies the round-trip propagation delay measurement unit 120 of the event. The round-trip propagation delay measurement unit 120 inputs the round-trip propagation delay amount to be sent the subscriber station 30 after the link switching operation to the central processing unit 110.

The central processing unit 110 subtracts the round-trip propagation delay from the system delay stored therein to obtain the delay difference (steps S523 and S524). Next, the central processing unit 110 updates the previous transmission delay by adding the delay difference to the transmission delay of the subscriber station 30 stored in the storage unit 130 (steps S525 and S526).

Furthermore, in order to input the updated transmission delay to the delay setting unit 320 in the subscriber station 30, the central processing unit 110 creates and outputs a transmission delay setting signal to the tranceiver 100 and then transmits it to the subscriber station 30 (step S527). In order to ensure whether the transmission delay setting signal has been properly received, the center station 10 again transmits the round-trip propagation delay measurement signal to the subscriber station 30 (step S528). In a similar manner to that at the normal operation, the transmission delay is repeatedly updated until a receive error between the round-trip propagation delay and the system delay becomes less than a permissible value.

Similarly, the updating operation is performed to the subscriber stations 31 and 32 to finish the delay amount setting operation (steps S529, S530, S531, S532 and S533).

As described above, compared with the case where the round-trip propagation delay is re-measured to each subscriber station, the system recovery time at the link switching time can be shortened by updating the transmission delays of all subscriber stations connected to the relay station 20 using a delay difference of a given subscriber station.

Moreover, even when the linking is switched back from the stand-by system relay transmission line 60 to the working system relay transmission line 50 after the recovery of a failure in the working system relay transmission line 50, the system recovery time can be shortened by updating the transmission delays of all subscriber stations using a delay difference of a given subscriber station.

Figure 4:
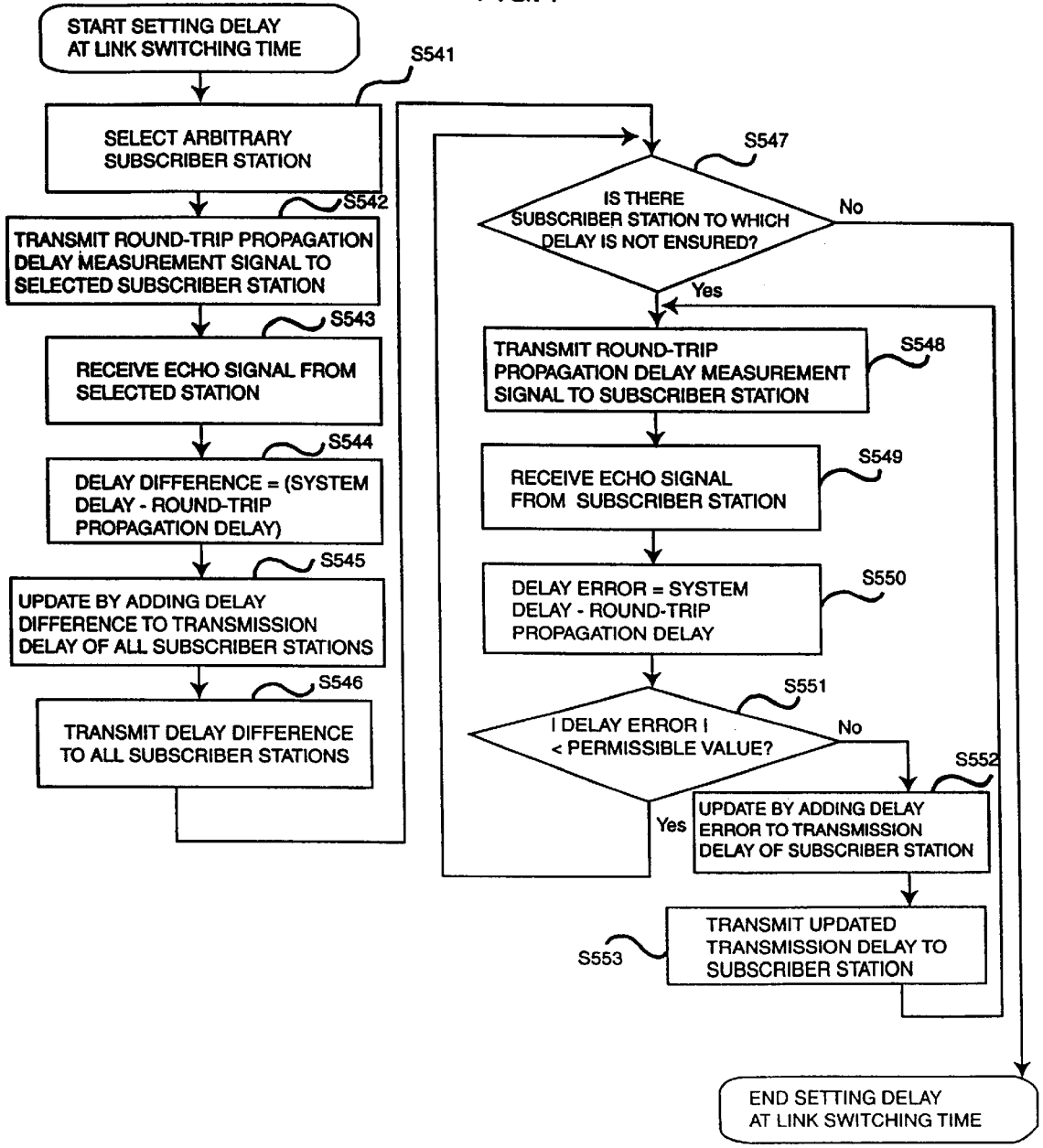
FIG. 4 is a flowchart illustrating the operational procedure of the center station for setting a delay at a link switching time, according to the second embodiment.

FIG. 4 is a flowchart illustrating the operational procedure of the center station 10 for setting a delay at a link switching time according to the second embodiment.

Like the first embodiment, the system includes the center station 10, the relay station 20, and subscriber stations 30 to 32. The operational flow of the center station 10 at a normal operation time is similar to that in the first embodiment. When the round-trip propagation delay of an arbitrary subscriber station is measured after the occurrence of a link switching operation to obtain a delay difference (steps S541, S542, S543 and S544), the central processing unit 110 in the center station 10 updates the previous transmission delay amounts by adding the delay difference to the delays of all subscriber stations connected to the relay station 20 stored in the storage unit 130 (steps S545).

Next, the delay difference is transmitted to all the subscriber stations connected to the relay stations 20 (step S546). A broadcast address or multicast address is used as an address for identifying the destination for the delay difference so as to be received by all subscriber stations connected to the relay station 20. When the delay setting unit 320 in the subscriber station 30 receives the delay difference, the previous transmission delay is updated by adding the delay difference to the transmission delay at a receive time. When the delay setting unit 321 in the subscriber station 31 receives the delay difference, the previous transmission delay is updated by adding the delay difference to the transmission delay at a receive time. When the delay setting unit 322 in the subscriber station 32 receives the delay difference, the previous transmission delay is updated by adding the delay difference to the transmission delay at a receive time.

Next, in order to ensure whether the subscriber station 30 has reset the transmission delay, the center processing unit 110 in the center station 10 transmits a round-trip propagation delay measurement signal to the subscriber station 30 (steps S547 and S548). The central processing unit 110 receives an echo signal from the subscriber station 30 (step S549). Like the first embodiment, the central processing unit 110 resets the transmission delay when the delay error is more than a permissible value, but ends to reset the delay to the subscriber 30 when the delay error is less than the permissible value (steps S550 and S551).

Thereafter, the same procedure is repeated to the subscriber stations 31 and 32. As described above, the system recovery time associated with the resetting of a transmission delay can be shortened by transmitting a delay difference to a given subscriber station to all subscriber stations at a link switching time using a broadcast address or multicast address.

Figure 5:
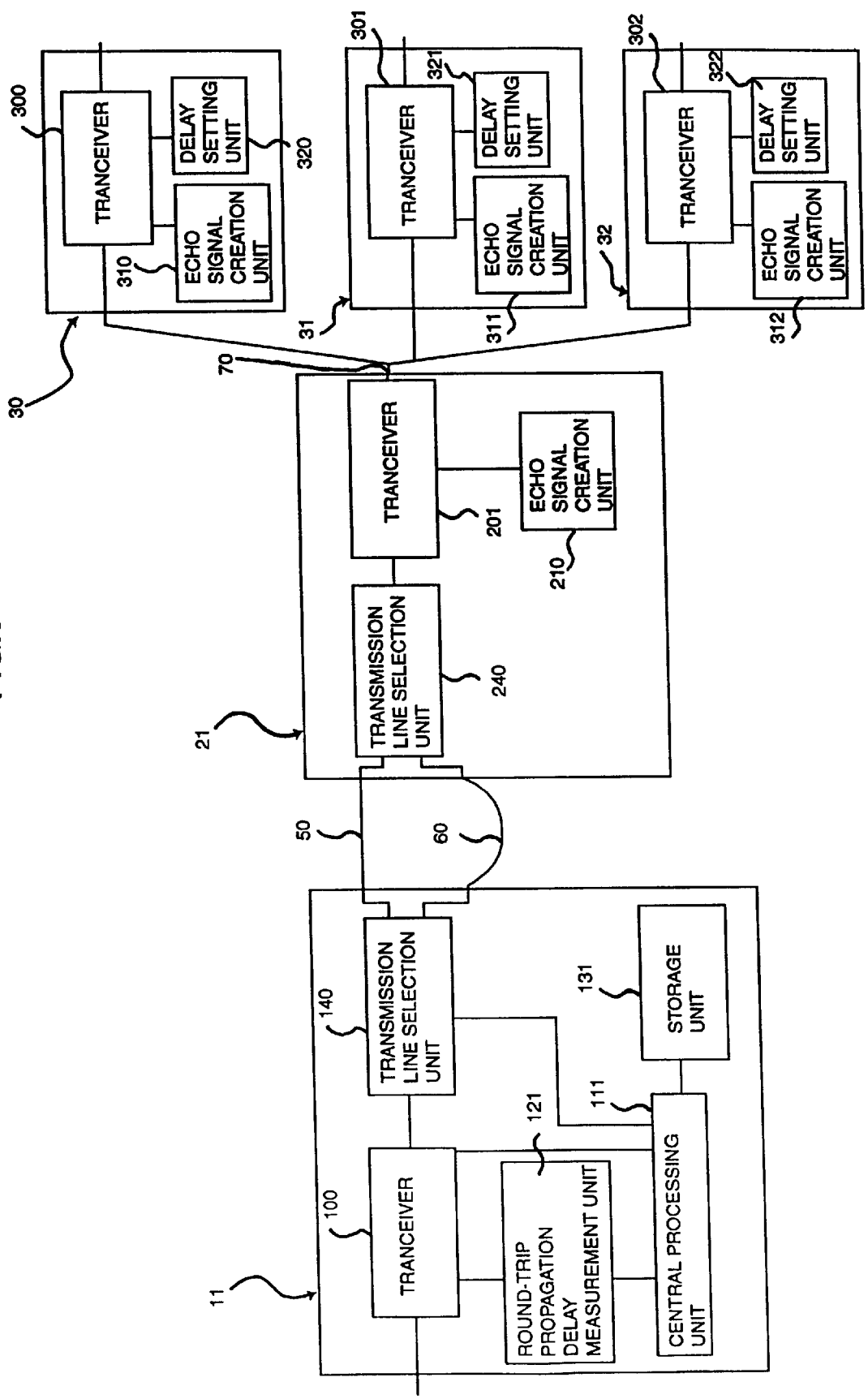
FIG. 5 is a block diagram illustrating the configuration of a system, which includes a center station, a relay station and subscriber stations, for setting a delay, according to the third embodiment.

FIG. 5 is a block diagram illustrating the configuration of a system, including a center station 11, a relay station 21 and subscriber stations 30 to 32, for setting a delay, according to the third embodiment.

Referring to FIG. 5, the function of the relay station 50 in a working system and the function of the relay transmission line in a stand-by system are same as those in the first embodiment. The center station 11 consists of a tranceiver 100, a central processing unit 111, a round-trip propagation delay measurement unit 121, a storage unit 131, and a transmission line selection unit 140.

The central processing unit 111 creates and outputs the round-trip propagation delay measurement signal for the relay station 21 and the subscriber stations 30 to 32 to the tranceiver 100 and the round-trip propagation delay measurement unit 121. The central processing unit 111 receives the round-trip propagation delay of the relay station 21 from the round-trip propagation delay measurement unit 121 and then outputs it to the storage unit 131.

When receiving the round-trip propagation delays of subscriber stations 30 to 32 from the round-trip propagation delay measurement unit 131, the central processing unit 111 calculates the transmission delays of the subscriber stations 30 to 32 and then outputs the result to the storage unit 131. Thus, central processing unit 111 creates the transmission delay setting signal to the subscriber stations 30 to 32 and then outputs it to the tranceiver 100.

In response to a round-trip propagation delay measurement signal from the central processing unit 111, the round-trip propagation delay measurement unit 121 measures the interval between the time the tranceiver 100 transmits the round-trip propagation delay measurement signal to the relay station 21 or the subscriber station 30 to 32 and the time the tranceiver 100 receives an echo signal, thus outputting it as a round-trip propagation delay to the central processing unit 111.

The storage unit 131 stores transmission delays of the subscriber stations 30 to 32 in operation input to the central processing unit 111 and the round-trip propagation delay to the relay station 21. The function of the transmission line selection unit 140 is similar to that in the first embodiment.

The relay station 21 is configured of a tranceiver 201, an echo signal creation unit 210, and a transmission line selection unit 240. The tranceiver 201 relays a signal from the transmission line selection unit 240 to the subscriber system transmission line 70 and relays a signal from the subscriber system transmission line 70 to the transmission line selection unit 240.

The tranceiver 201 separates the round-trip propagation delay measurement signal transmitted to the relay station 21 from the signal input to the transmission line selection unit 240 and then outputs it the echo signal creation unit 210.

The echo signal creation unit 210 multiplexes the input echo signal with the signal input from the subscriber system transmission line 70 and then outputs the result to the transmission line selection unit 240. In response to the round-trip propagation delay measurement signal from the tranceiver 201, the echo signal creation unit 210 immediately creates and outputs an echo signal to the tranceiver 201. The function of the transmission line selection unit 240 is the same as that in the first embodiment. The function of each of the subscriber stations 30 to 32 is the same as that in the first embodiment.

Figure 6:
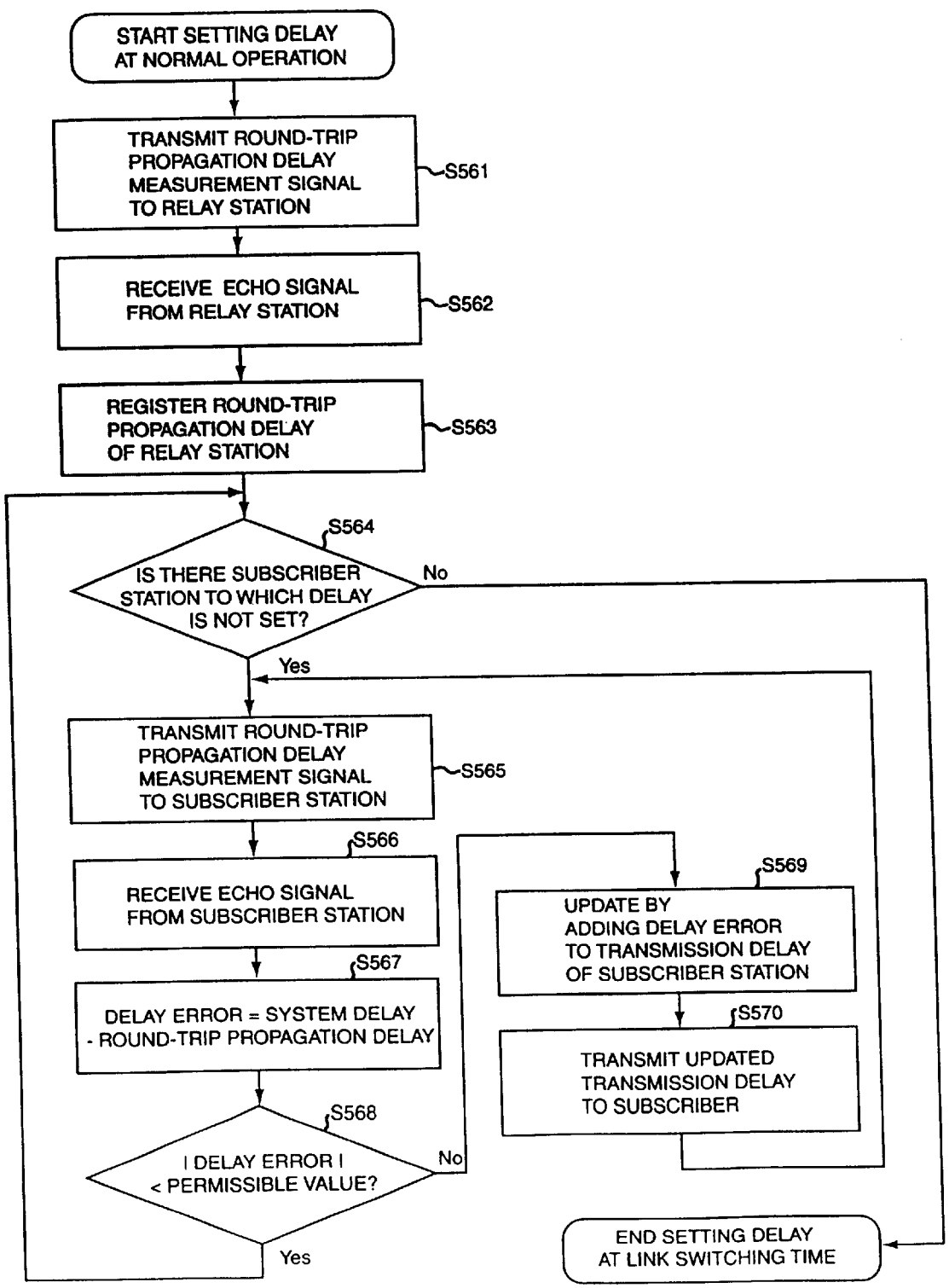
FIG. 6 shows a flowchart illustrating the operational procedure of the center station for setting a delay at a normal operation time, according to the third embodiment.

FIG. 6 is a flowchart illustrating an operational procedure of the center station 11 for setting a delay at a normal operation time, according to the third embodiment.

The center station 11 first transmits a round-trip propagation delay measurement signal to the relay station 21 (step S561). The center station 11 receives an echo signal from the center station 21 to obtain a round-trip propagation delay to the center station 21 (steps S562 and S563).

Next, the storage unit 131 stores the round-trip propagation delay to the relay station 21. Thereafter, when a subscriber station to which a delay is not set is recognized, the delay setting operation is repeated according to the same procedure as that for the delay setting of the first embodiment shown in FIG. 2 until no subscriber stations to which a delay is not set exist (steps S564, S565, S566, S567, S568, S569, and S570).

Figure 7:
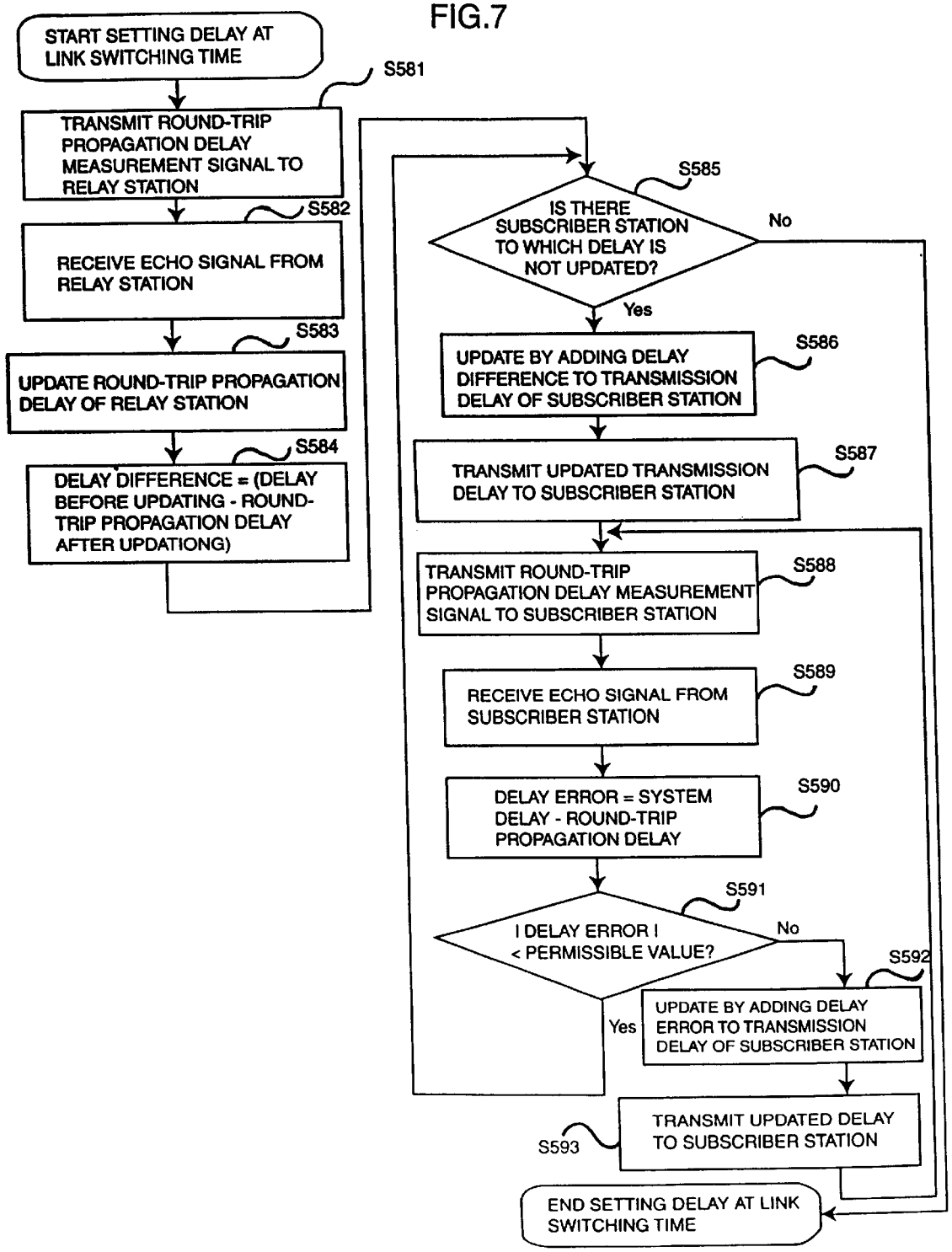
FIG. 7 shows a flowchart illustrating the operational procedure of the center station for setting a delay at a link switching time, according to the third embodiment.

FIG. 7 is a flowchart illustrating an operational procedure of the center station 11 for setting a delay at a link switching time, according to the third embodiment.

When a link switching operation occurs, the central processing unit 111 in the center station 11 creates a round-trip propagation delay measurement signal to the relay station 21 and then outputs it to the tranceiver 100. When the tranceiver 100 in the center station 11 receives an echo signal from the relay station 21, the round-trip propagation delay measurement unit 121 inputs the round propagation delay for the center station 21 after a link switching operation to the central processing unit 111.

The central processing unit 111 updates the round-trip propagation delay for the relay station 21 stored in the storage unit 131 (steps S581, S582, and S583), calculates the difference between the round-trip propagation delay for the center station 21 before a link switching operation and the round-trip propagation delay after the switching operation, thus obtaining a delay difference (step S584). The previous transmission delay is updated by adding the delay difference to the transmission delay for a subscriber station 30 stored in the storage unit 131 (steps S584, 585 and S586).

Next, in order to update the internal transmission delay of the subscriber station 30, the central processing unit 111 creates a transmission delay setting signal and then transmits it to the subscriber station 30 via the tranceiver 100 (step S587). In order to ensure whether the transmission delay setting signal has been properly received, the center station 11 transmits a round-trip propagation delay measurement signal to the subscriber station 30, and repeatedly updates the transmission delay, in a similar manner to that at a normal operation, until the receive error between the round-trip propagation delay and the system delay becomes less than a permissible value.

The delay setting operation is ended by performing the same procedure to the subscriber stations 31 and 32 (steps S588, S589, S590, S591, S592, and S593). As described above, the system recovery time at a link switching time can be shortened by updating the transmission delays of all subscriber stations connected to the relay station 21 by using the delay difference for the relay station 21.

Figure 8:
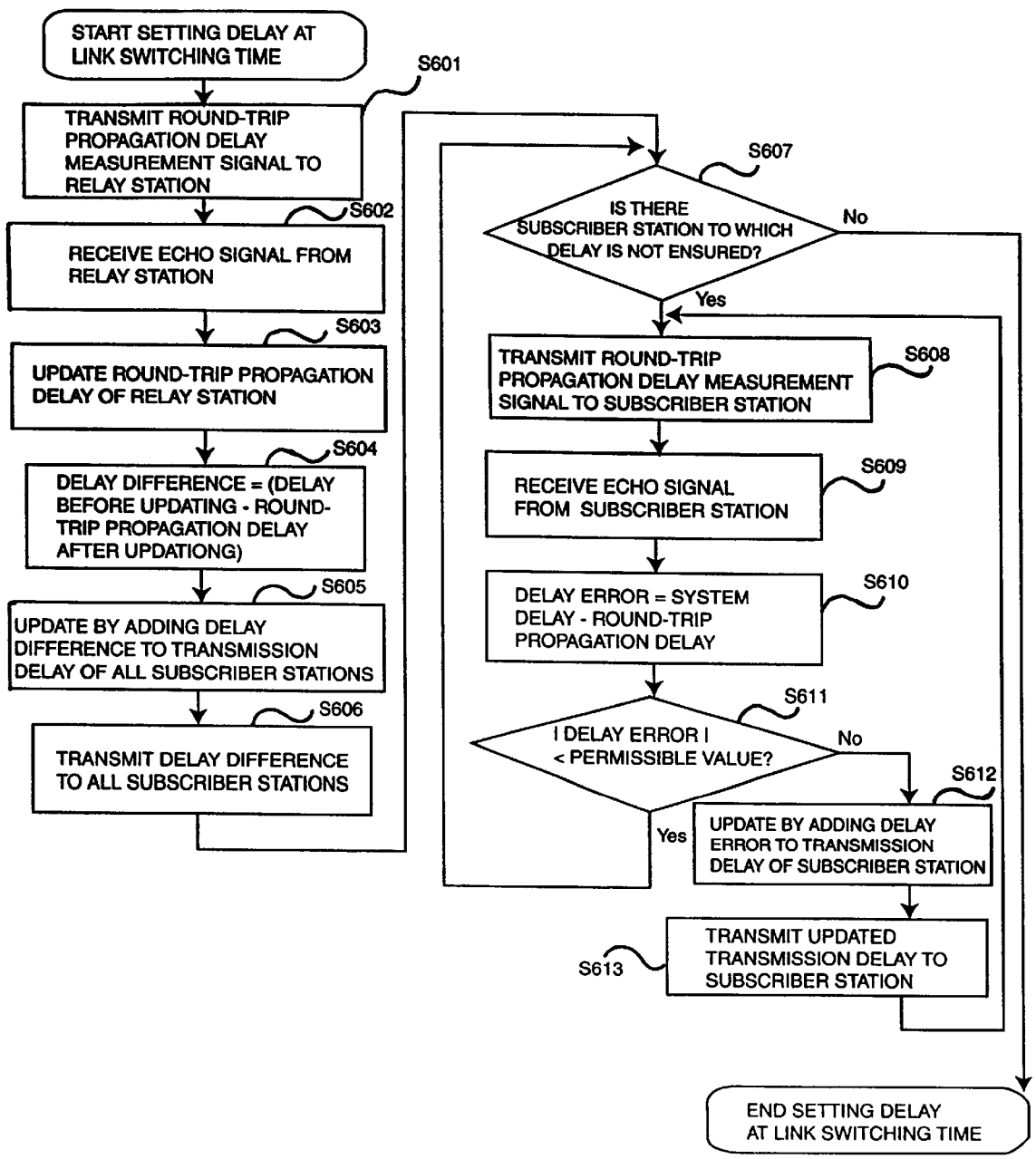
FIG. 8 is a flowchart illustrating the operational procedure of the center station for setting a delay at a link switching time, according to the fourth embodiment.

FIG. 8 is a flowchart illustrating an operational procedure in the center station 11 for setting a delay at a link switching time, according to the fourth embodiment.

As to the center station 11, the relay station 21, and the subscriber stations 30 to 32, each configuration is the same as that in the third embodiment. The operational flow of the center station 11 at a normal operation is the same as that in the third embodiment. When a link switching operation occurs, the center station 11 measures the round-trip propagation delay for the relay station 21 to obtain a delay difference (steps S601, S602, S603, and S604).

Thereafter, the central processing unit 111 in the center station updates the previous transmission delay by adding the delay difference to the transmission delays of all subscriber stations connected to the relay station 21 stored in the storage unit 131 (step S605).

Next, the delay difference is transmitted to all the subscriber stations connected to the relay station 21 (step S606). A broadcast address or multicast address is used as an address for identifying the destination of the delay difference signal to be received by all subscriber stations connected to the relay station 21. When receiving the delay difference, the delay setting unit 320 in the subscriber station 30 updates the transmission delay by adding the delay difference to the transmission delay at a receive time. When receiving the delay difference, the delay setting unit 321 in the subscriber station 31 updates the transmission delay by adding the delay difference to the transmission delay at a receive time. When receiving the delay difference, the delay setting unit 322 in the subscriber station 32 updates the transmission delay by adding the delay difference to the transmission delay amount at a receive time.

Next, in order to ensure whether the subscriber station 30 has reset the transmission delay, the central processing unit 111 in the center station 11 transmits a round-trip propagation delay measurement signal to the subscriber station 30 (steps S607 and S608).

An echo signal from the subscriber station 30 is received (step S609). When the delay error is more than a permissible value, the transmission delay is reset. When the delay error is less than a permissible value, resetting the delay for the subscriber station 30 is ended (steps S610, S611, S612, and S613). Thereafter, the same procedure is performed to the subscriber stations 31 and 32.

As described above, the system recovery time for a transmission delay resetting operation can be shortened by transmitting the delay difference to the relay station at a link switching time using a broadcast address or multicast address to all subscriber stations.

Figure 9:
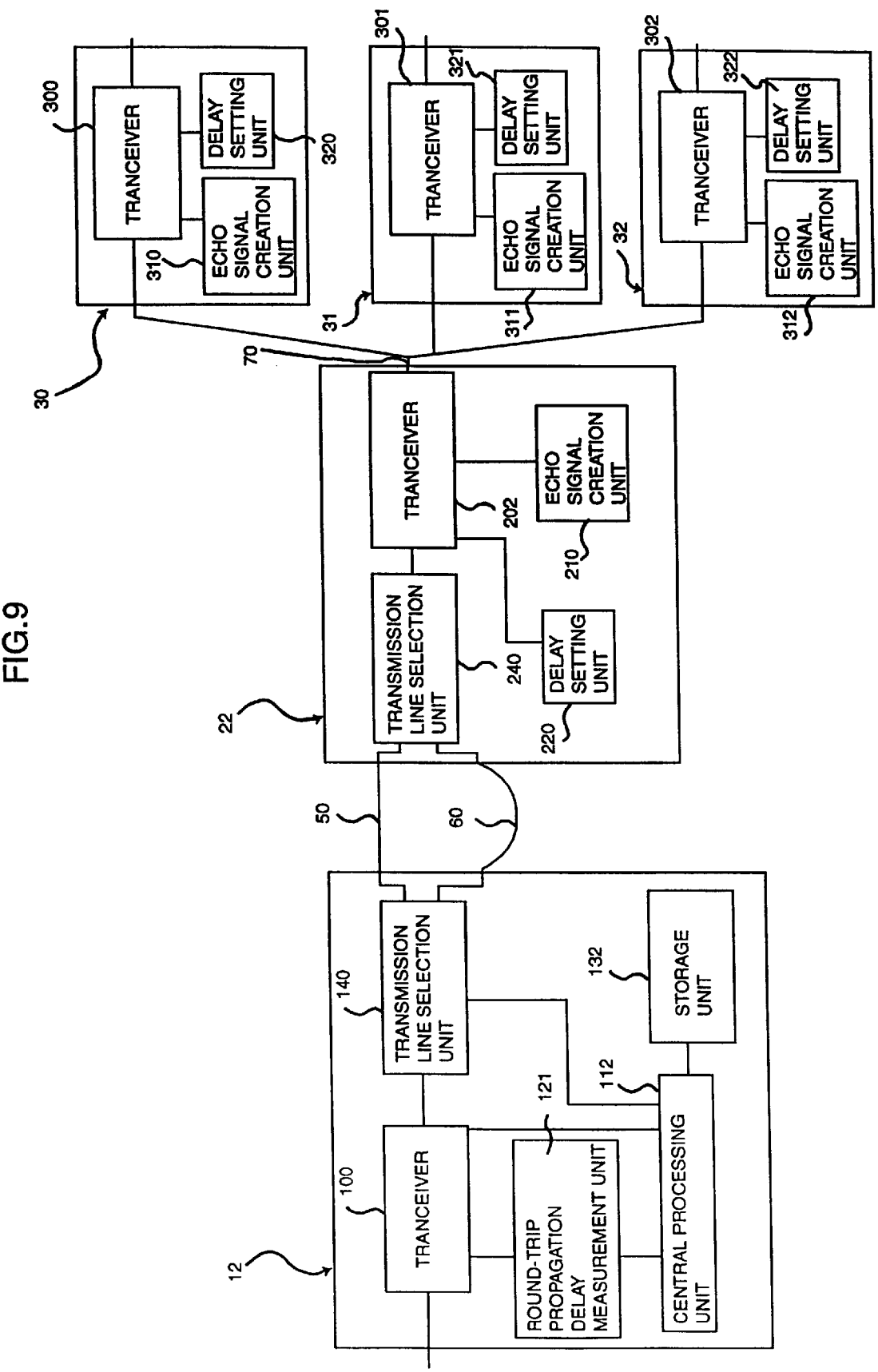
FIG. 9 is a block diagram illustrating the configuration of a system, which includes a center station, a relay station and subscriber station, for setting a delay, according to the fifth embodiment.

FIG. 9 is a block circuit diagram illustrating the configuration of a system including the center station 12, the relay station 22, and the subscriber stations 30 to 32 for setting a delay, according to the fifth embodiment.

As to the subscriber stations 30 to 32, the working system relay transmission line 50, the stand-by system relay transmission line 60, shown in FIG. 9, each configuration is similar to that of the corresponding element in the first embodiment. The center station 12 consists of a tranceiver 100, a central processing unit 112, a round-trip propagation delay measurement unit 121, a storage unit 132, and a transmission line selection unit 140. The function of the tranceiver 100 is similar to that in the first embodiment.

The central processing unit 112 creates round-trip propagation delay measurement signals to the relay station 20 and the subscriber stations 30 to 32 and then outputs them to the round-trip propagation delay measurement unit 121. When receiving a round-trip propagation delay of the relay station 22 from the round-trip propagation delay measurement unit 121, the central processing unit 112 calculates the transmission delay of the relay station 22 and then outputs it to the storage unit 132. The central processing unit 112 also creates a transmission delay setting signal to the relay station 22 and then outputs it to the tranceiver 100.

When receiving the round-trip propagation delays of the subscriber stations 30 to 32 from the round-trip propagation delay measurement unit 121, the central processing unit 112 calculates them and outputs the result to the storage unit 132. The central processing unit 112 further creates the transmission delay setting signals for subscriber stations 30 to 32 and then outputs them to the tranceiver 100. The function of the round-trip propagation delay measurement unit 121 is similar to that in the third embodiment. The storage unit 132 saves the transmission delays for the subscriber stations 30 to 32 in operation input from the central processing unit 112 as well as the round-trip propagation delay to the relay station 22. The function of the transmission line selection unit 140 is similar to that in the first embodiment.

The relay station 22 consists of a tranceiver 202, an echo signal creation unit 210, a delay setting unit 220, and a transmission line selection unit 240. The tranceiver 202 has the function of the tranceiver 201 in the third embodiment. The tranceiver 202 further separates a transmission delay setting signal transmitted by the relay station 22 from the signal input by the transmission line selection unit 240, outputs it to the delay setting unit 220, adds a delay input from the delay setting unit 220 to the signal input from the subscriber system transmission line 70, and finally outputs the result to the transmission line selection unit 240.

The function of the delay setting unit 220 is similar to the delay setting unit 320 in the subscriber station 30, to the delay setting unit 321 in the subscriber station 31, or to the delay setting unit 322 in the subscriber station 32. The delay setting unit 220 outputs a delay to be set to the tranceiver 202, based on the transmission delay setting signal input from the tranceiver 202. The function of the echo signal creation unit 210 is similar to that in the first embodiment while the function of the transmission line selection unit 240 is similar to that in the first embodiment.

Figure 10:
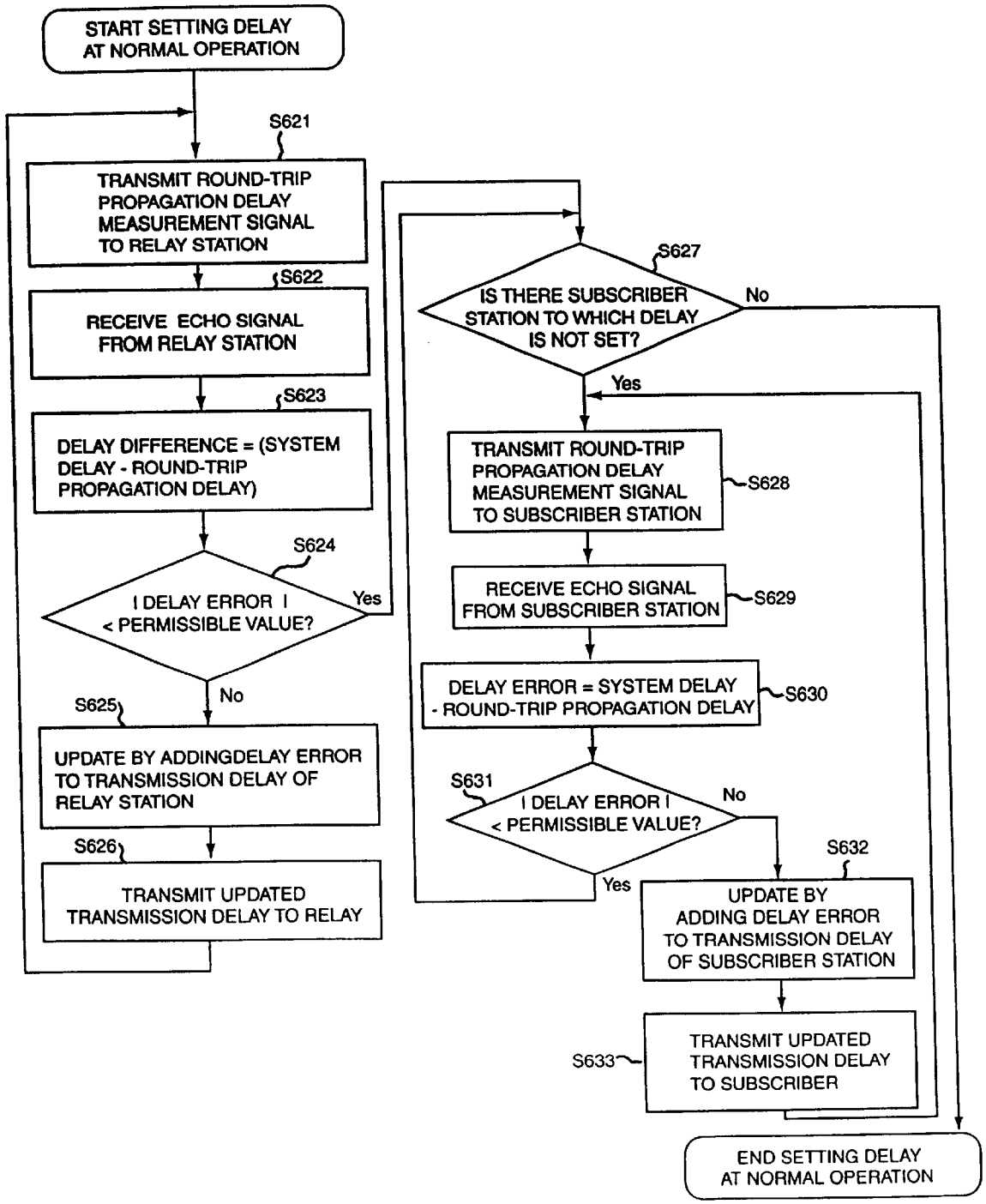
FIG. 10 is a flowchart illustrating the operational procedure of the center station for setting a delay at a normal operation time, according to the fifth embodiment.

FIG. 10 is a flowchart illustrating an operational procedure of the center station 12 for setting a delay at a normal operation time according to the fifth embodiment.

The center station 12 first transmits a round-trip propagation delay measurement signal to the relay station 22 (step S621) and obtains a round-trip propagation delay to the relay station 22 in response to an echo signal from the relay station 22 (step S622). The central processing unit 112 in the center station 12 internally holds the system delay of the center station. The relay station system delay corresponds to a value or fixed value which is set as a round-trip propagation delay to the relay station using the longest one of the relay transmission lines.

The central processing unit 112 subtracts a round-trip propagation delay for the relay station from the system delay of the relay station to obtain a delay error (step S623). When the delay error is more than a permissible value, the central processing unit 112 updates the previous transmission delay by adding the delay error to the transmission delay of the relay station 22 stored in the storage unit 132, thus transmitting the transmission delay setting signal to the relay station 22 (steps S624, S625, and S626). Thereafter, the round-trip propagation delay measurement signal is repeatedly transmitted until the delay error is less than a permissible value. When a delay has been completely set to the relay station 22, the delay setting process is performed to a subscriber station to which a delay is not set, according to the same procedure as that in the first embodiment (steps S627, S628, S629, S630, S631, S632, and S633).

Figure 11:
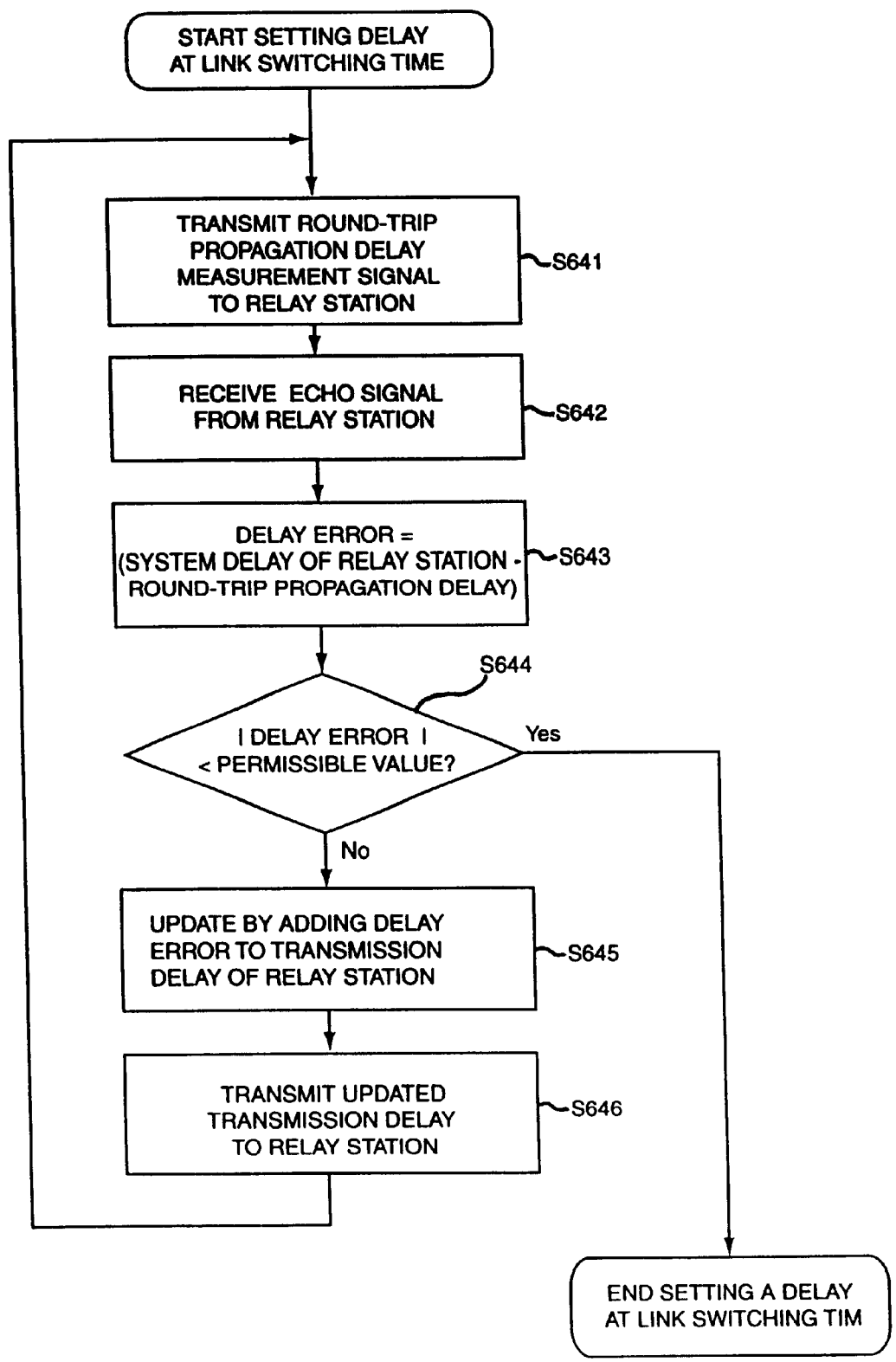
FIG. 11 shows a flowchart illustrating the operational procedure of the center station for setting a delay at a link switching time, according to the fifth embodiment.

FIG. 11 is a flowchart illustrating an operational procedure of the center station 12 for setting a delay at a link switching time according to the fifth embodiment.

The center station 10 first transmits a round-trip propagation delay measurement signal to the relay station 22 (step S641). The center station 10 receives an echo signal from the relays station 22 to obtain a round-trip propagation delay to the relay station 22 (steps S642 and S643).

The central processing unit 112 in the center station 12 subtracts a round-trip propagation delay to the relay station 22 from the system delay of the relay station to obtain a delay error. When the delay error is more than a permissible value, the central processing unit 112 updates the previous transmission delay by adding the delay error to the transmission delay of the relay station stored in the storage unit 132, and then transmits a transmission delay setting signal to the relay station 22.

Thereafter, the delay at a link switching operation is set by transmitting the round-trip propagation delay measurement signal until the delay error becomes less than a permissible value (steps S644, S645, and S646). According to the fifth embodiment, since the delay adjusting function added to the relay station can absorb a variation at a delay setting operation involved in the switching of a transmission line, the system recovery time can be shortened compared with the case where a delay is reset to each subscriber.

Figure 12:
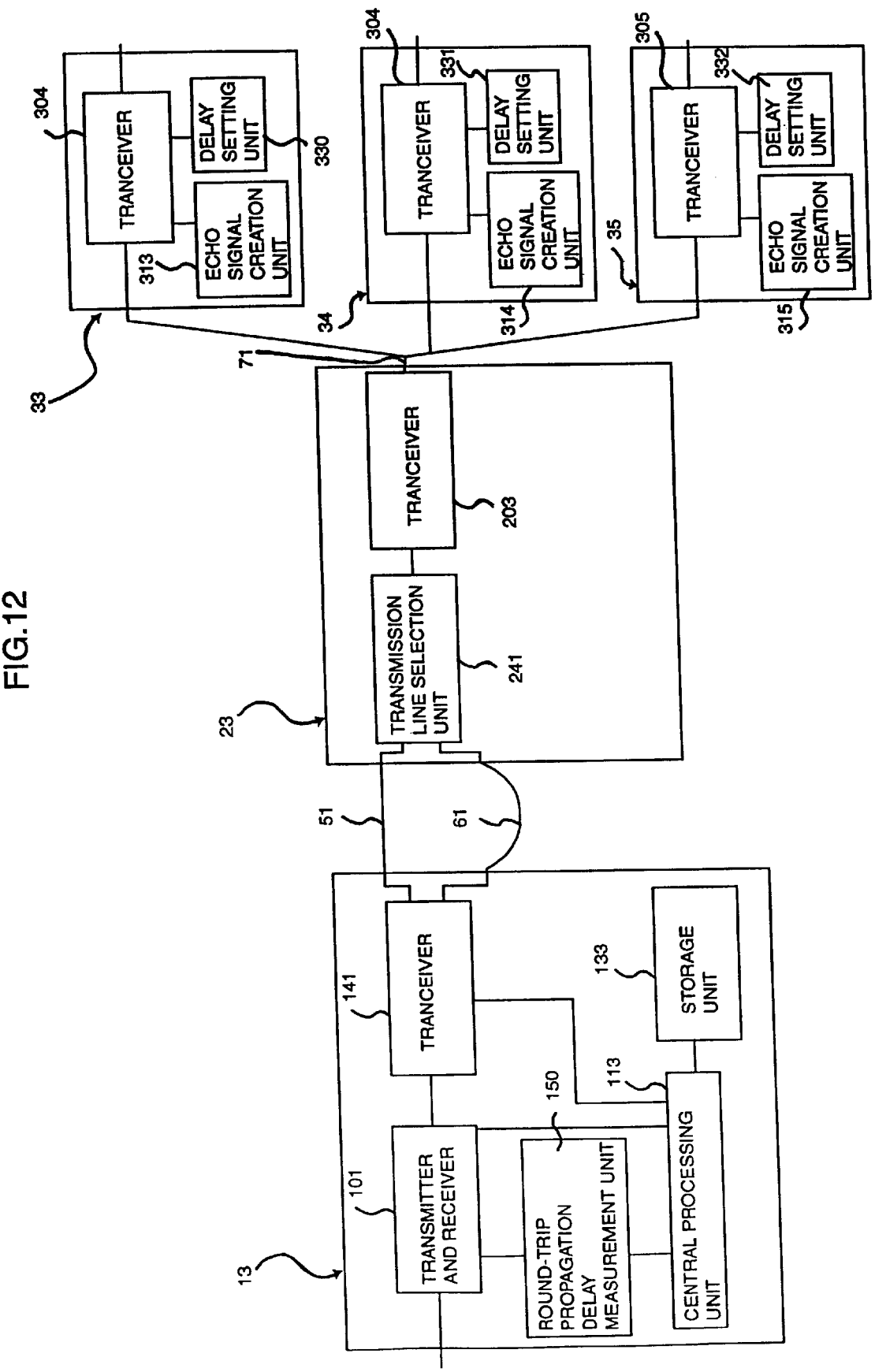
FIG. 12 is a block diagram illustrating the configuration of a system, which includes a center station, a relay station, and subscriber stations, for setting a transmission level, according to the sixth embodiment.

FIG. 12 is a block circuit diagram illustrating the configuration of a system including a center station 13, a relay station 20, and subscriber stations 30 to 32 for setting a transmission level according to the sixth embodiment.

Referring to FIG. 12, the center station 13 is connected to the relay station 23 by means of the working system relay transmission line 51 and the stand-by system relay transmission line 61. The relay station 23 is connected to the subscribers 33, 34, and 35 via the subscriber transmission line 71.

The center station 13 a tranceiver 101, a central processing unit 113, a receive level measurement unit 150, a storage unit 133, and a transmission line selection unit 141. The tranceiver 101 transmits and receives a signal input to and output from external equipment such as an exchange or router and a signal input to and output from the transmission line selection unit 141. The tranceiver 101 also multiplexes a main signal with a level measurement signal, an echo signal, and a transmission level signal, and separates a level measurement signal, an echo signal, and a transmission level signal from a main signal. The central processing unit 113 creates a level measurement signal and outputs it to the tranceiver 101 and the receive level measurement unit 150.

When receiving receive levels of the subscriber stations 33 to 35 from the receive level measurement unit 150, the central processing unit 113 calculates transmission levels of the subscriber stations 30 to 32 and stores them to the storage unit 133. The central processing unit 113 further creates a transmission level setting signal and then outputs it to the tranceiver 101. The receive level measurement unit 150 measures the levels of signals from the subscriber stations 33 to 35 or the level of a signal from the relay station 23 received by the tranceiver 101 and then outputs them or it to the central processing unit 113.

The storage unit 133 stores respective transmission levels to the subscriber stations 33 to 35 in operation input from the central processing unit 113. The transmission line selection unit 141 monitors a possible failure in the working system relay transmission line 51 or the stand-by system transmission line 61. The transmission line selection unit 141 switches a signal input to or output from the tranceiver 100 form the working system relay transmission line 51 to the stand-by system relay transmission line 61 when a failure occurs in the working system relay transmission line 51, or returns the signal from the stand-by relay transmission line 61 to the working system relay transmission line 51 when the failed working system relay transmission line 51 has recovered.

The relay station 23 consists of a tranceiver 203 and a transmission line selection unit 241. The tranceiver 203 relays a signal from the transmission line selection unit 241 to the subscriber system transmission line 71 and a signal from subscriber system transmission line 71 to the transmission line selection unit 241. The transmission line selection unit 241 has the same function as the transmission line selection unit 141 in the center station.

The subscriber station 33 includes a tranceiver 303, an echo signal creation unit 313, and a transmission level setting unit 313. The subscriber station 34 includes a tranceiver 304, an echo signal creation unit 314, and a transmission level setting unit 314. The subscriber station 35 includes a tranceiver 305, an echo signal creation unit 315, and a transmission level setting unit 315. Each of the tranceivers 303 to 305 transmits and receives a signal input to and output from the subscriber transmission line 71 and a signal input to and output from external equipment such as telephones or computers and multiplexes a main signal with a level measurement signal, an echo signal, or level setting signal and separates a level measurement signal, an echo signal, or level setting signal from a main signal.

The tranceiver 303 sets the transmission level of a signal to be transmitted to the center station based on the transmission level input from the transmission level setting unit 330. The tranceiver 304 sets the transmission level of a signal to be transmitted to the center station based on the transmission level input from the transmission level setting unit 331. The tranceiver 305 sets the transmission level of a signal to be transmitted to the center station based on the transmission level input from the transmission level setting unit 332. In response to the level measurement signal from the tranceiver 303, the echo signal creation unit 313 immediately creates and outputs an echo signal to the tranceiver 303. In response to the level measurement signal from the tranceiver 304, the echo signal creation unit 314 immediately creates and outputs an echo signal to the tranceiver 304. In response to the level measurement signal from the tranceiver 305, the echo signal creation unit 315 immediately creates and outputs an echo signal to the tranceiver 304. The transmission level setting unit 330 outputs a transmission level to be set to the tranceiver 303 based on the transmission level setting signal input from the tranceiver 303. The transmission level setting unit 331 outputs a transmission level to be set to the tranceiver 304 based on the transmission level setting signal input from the tranceiver 304. The transmission level setting unit 332 outputs a transmission level to be set to the tranceiver 305 based on the transmission level setting signal input from the tranceiver 305.

Figure 13:
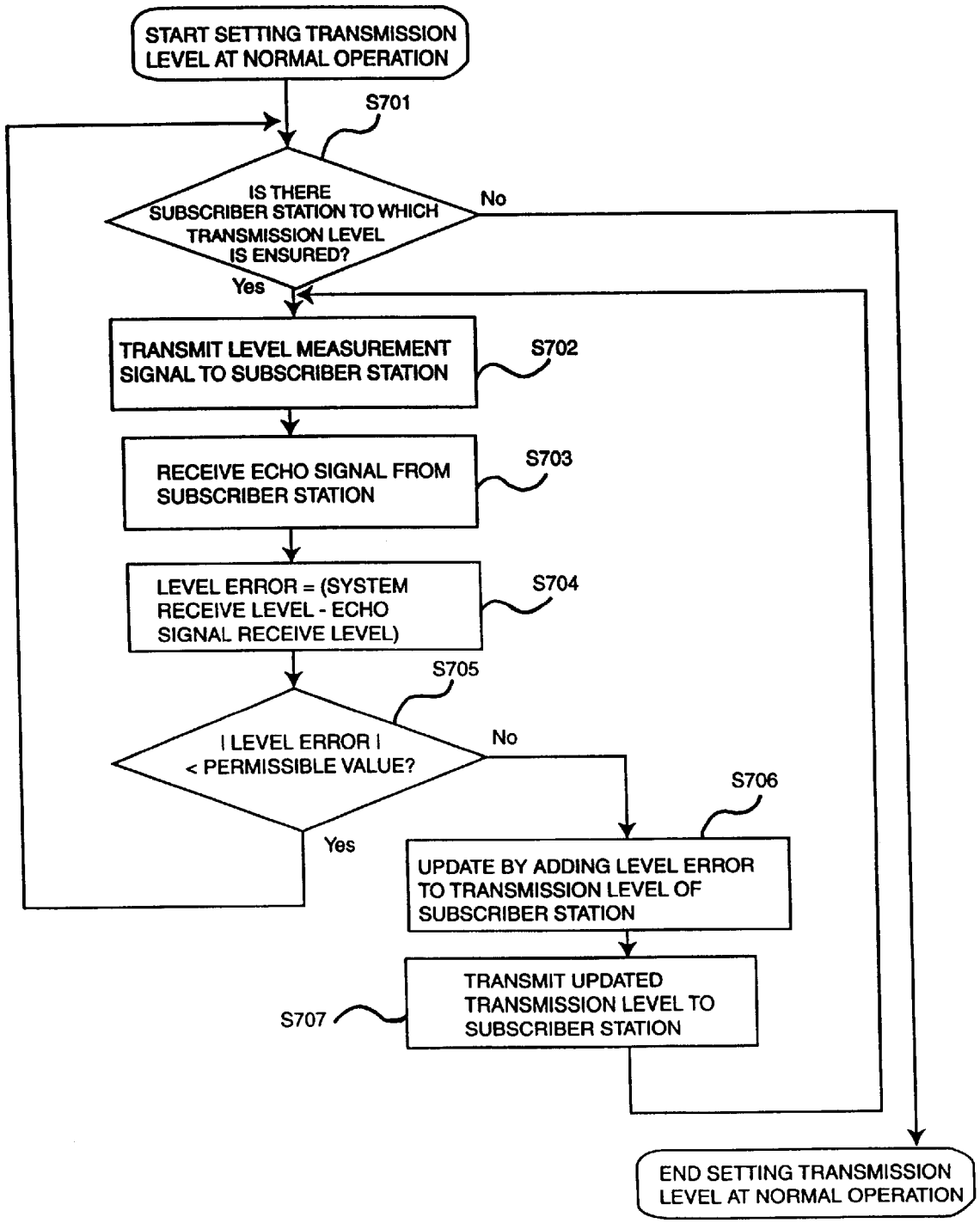
FIG. 13 is a flowchart illustrating the operational procedure of the center station for setting a transmission level at a normal operation time, according to the sixth embodiment.

FIG. 13 is a flowchart illustrating an operational procedure of the center station 13 for setting a transmission level at a normal operation time, according to the sixth embodiment.

When recognizing the subscriber station 33 which starts to operate newly and to which a transmission level is not set, the central processing unit 113 in the center station 13 transmits a level measurement signal to the subscriber 33 (steps S701 and S702) while it activates the receive level measurement unit 150. When receiving an echo signal from the subscriber station 33, the receive level measurement unit 150 halts its operation (step S703).

In the center station 13, the central processing unit 113 internally holds the system receive level. The system receive level is a set value, or a fixed value, of a receive level in the center station. The central processing unit 113 subtracts the receive level of an echo signal from the system receive level to obtain a level error (step S704). When the level error is more than a permissible value, the central processing unit 113 updates the previous transmission level by adding the level error to the transmission level of the subscriber station 33 stored in the storage unit 133 and then stores the result in the storage unit 133. The transmission level corresponds to the level of a signal transmitted to the center station 13 by the subscriber station 33. When the subscriber station 33 newly starts its operation, the transmission level is set to a predetermined value.

Next, in order to update the transmission level of the subscriber 33, the central processing unit 113 creates a transmission level setting signal and outputs it to the tranceiver 101. In order to ensure whether the transmission level has been properly set, the central processing unit 113 again creates a level measurement signal to the subscriber station 33 and then outputs it to the tranceiver 101.

In contrast, when the level error is less than a permissible value, it is completed to set a transmission level to the subscriber station 33 (steps S705, S706, and S707). Thereafter, the same procedure is repeated until no subscriber stations to which a transmission level is not set exist.

Figure 14:
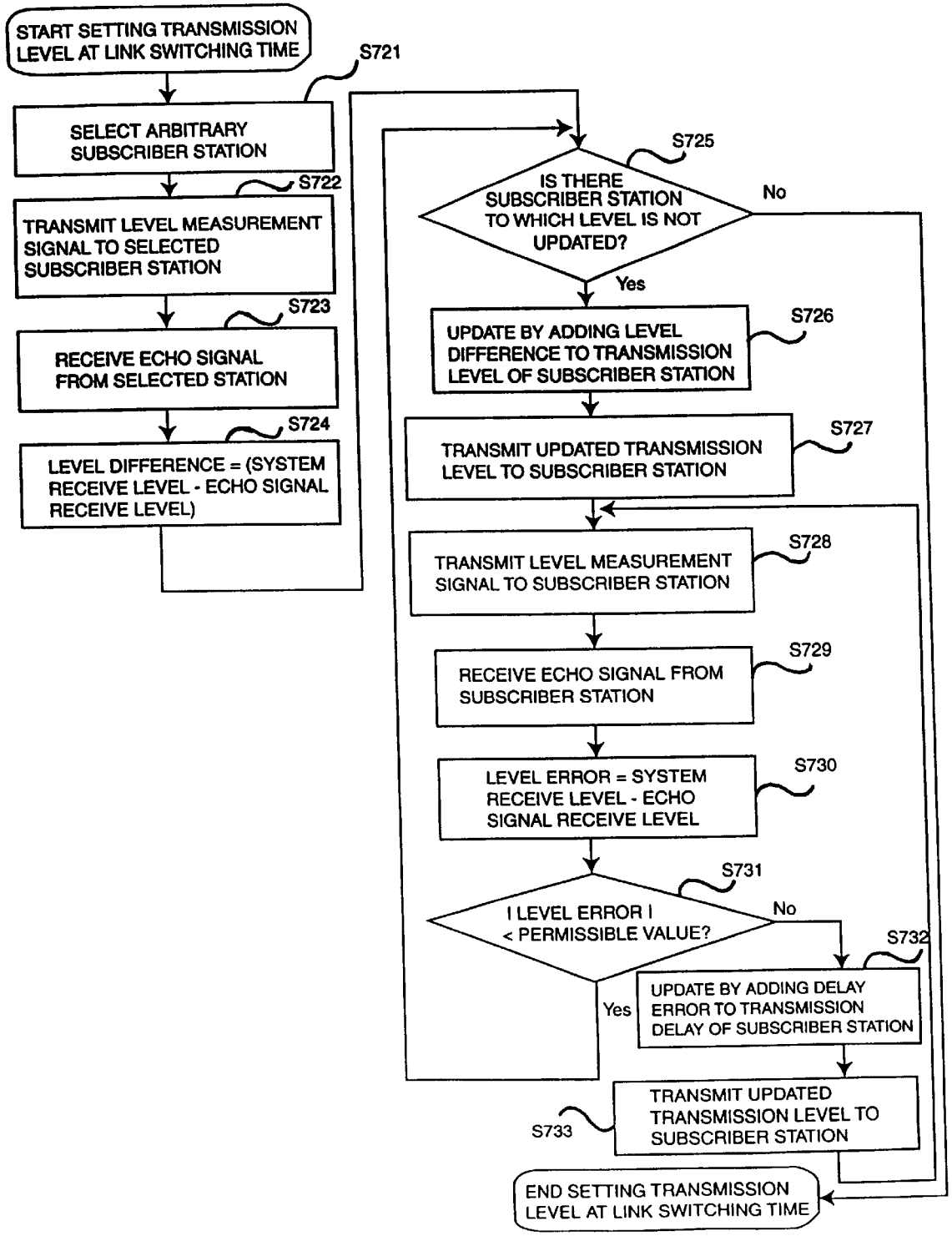
FIG. 14 is a flowchart illustrating the operational procedure of the center station for setting a transmission level at a link switching time, according to the sixth embodiment.

FIG. 14 is a flowchart illustrating an operational procedure of the center station 13 for setting a transmission level at a link switching time according to the sixth embodiment.

When the transmission line selection unit 141 in the center station 13 switches an I/O signal from the working system relay transmission line 51 to the stand-by relay transmission line 61, it notifies the central processing unit 113 of the occurrence of a link switching.

First, the central processing unit 113 selects an arbitrary subscriber station in operation connected to the relay station (step S721). If the central processing unit 113 selects the subscriber 13, it creates a level measurement signal to the subscriber station 33 and then transmits the created signal to the subscriber station 33 via the tranceiver 101 (step S722).

When receiving an echo signal from the subscriber station 33, the tranceiver 101 in the center station 13 notifies the receive level measurement unit 150 of the event. Then the receive level measurement unit 150 inputs the receive level of the echo signal to be sent to the subscriber station 33 after a link switching operation, to the central processing unit 113. The central processing unit 113 subtracts the receive level of the echo signal to be sent to the subscriber station 33 from the system receive level internally held (steps S723 and S724).

Next, the central processing unit 113 updates the previous transmission level by adding the level difference to the transmission level of the subscriber station 33 stored in the storage unit 133 (steps S725 and S726). In order to input the updated transmission level to the transmission level setting unit 330 in the subscriber station 33, the central processing unit 113 further transmits a transmission level setting signal to the subscriber station 33 via the tranceiver 101 (steps S727 and S728).

In order to ensure whether the transmission level setting signal has been properly received, the center station 13 again transmits a level measurement signal to the subscriber station 33 and updates the transmission level until a receive error between the receive level of the echo signal and the system receive level becomes less than a permissible value, in the same manner as that at the normal operation.

The transmission level setting is completed by performing the same process to the subscriber stations 34 and 35 (steps S729, S730, S731, S732, and S733). In such an operation, compared with the case where a level re-measurement process is performed to each subscriber station, the system recovery time at a link switching time can be shortened by updating the transmission levels of all the subscriber stations connected to the relay station 23 using the level error to an arbitrary subscriber station.

When the linking is switched back from the stand-by system relay transmission line 61 to the working system relay transmission line 51 after the recovery of a failure in the working system relay transmission line 51, the system recovery time can be shortened by similarly updating transmission levels of all subscriber stations using a level difference to an arbitrary subscriber station.

Figure 15:
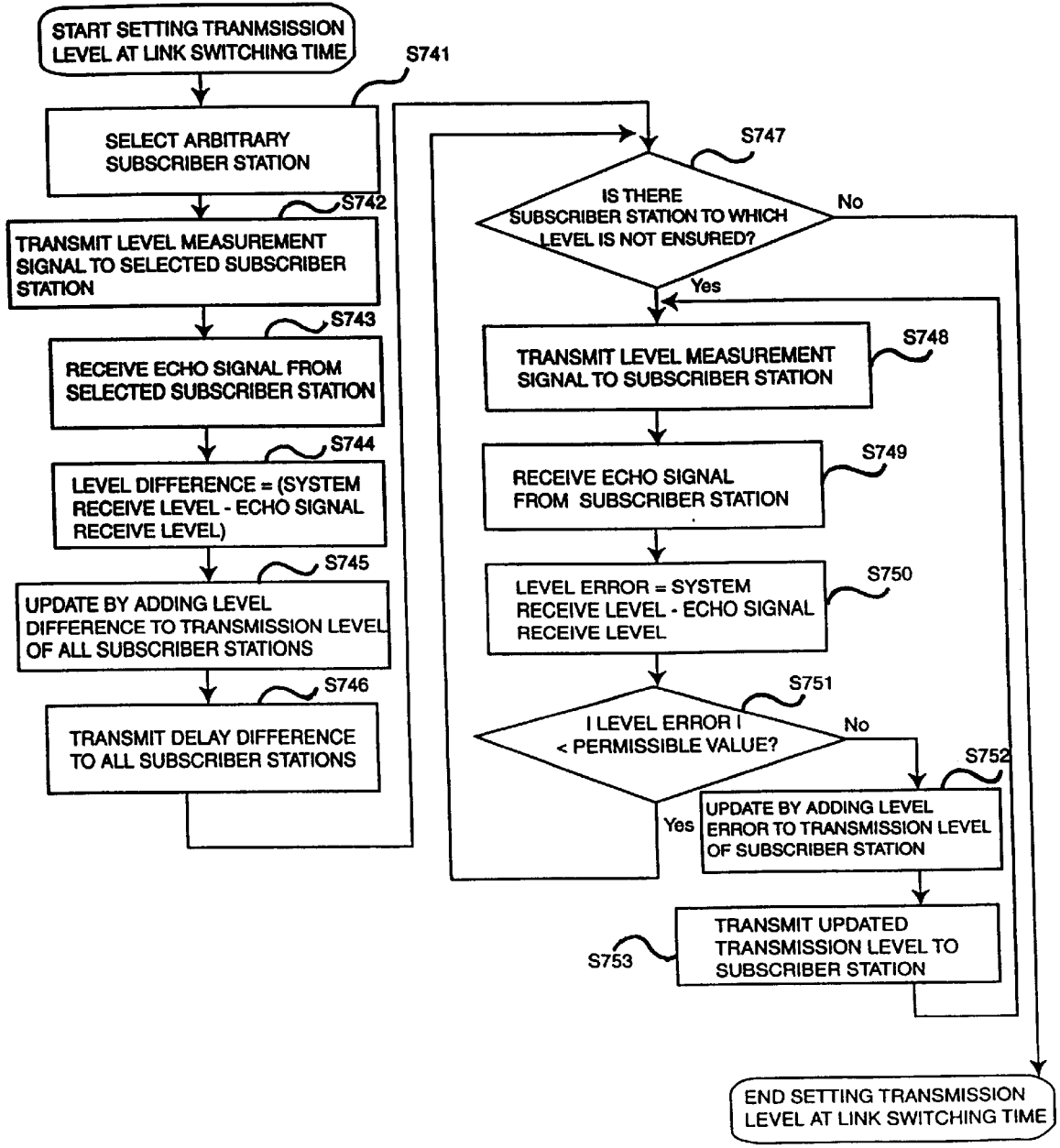
FIG. 15 is a flowchart illustrating the operational procedure of the center station for setting a transmission level at a link switching time, according to the seventh embodiment.

FIG. 15 is a flowchart illustrating an operational procedure of the center station 13 for setting a transmission level at a link switching time according to the seventh embodiment.

As to the center station 13, the relay station 23, and subscriber stations 33 to 34, each configuration is similar to that in the sixth embodiment. The operational procedure of the center station 13 in a normal operation is similar to that in the six embodiment. When a link switching operation occurs, the center station 13 obtains a level error difference by measuring the receive level of an echo signal to an arbitrary subscriber station (steps S741, S742, S743, and S744). Thereafter, the central processing unit 113 in the center station 13 updates the previous transmission level by adding the level difference to the transmission levels of all subscriber stations connected to the relay station 23 stored in the storage unit 133 (step S745).

Next, the level difference is transmitted to all the subscriber stations connected to the center station 23 (step S746). A broadcast address or multicast address is used as an address for identifying the destination of the level difference amount signal to be received by all subscriber stations connected to the relay station 23. In order to update the previous transmission level, the transmission level setting unit 330 in the subscriber station 33 receives the level difference and then adds it to the transmission level. In order to update the previous transmission level, the transmission level setting unit 331 in the subscriber station 34 receives the level difference and then adds it to the transmission level. In order to update the previous transmission level, the transmission level setting unit 332 in the subscriber station 35 receives the level difference and then adds it to the transmission level.

Successively, in order to ensure whether the subscriber station 33 has reset the transmission level, the central processing unit 113 in the center station 13 transmits a level measurement signal to the subscriber station 33. The central processing unit 113 receives an echo signal from the subscriber station 33. Like the sixth embodiment, when the level error is more than a permissible value, the central processing unit 113 resets the transmission level. When the level error is less than a permissible value, the resetting of the transmission level to the subscriber station 33 is ended (steps S747, S748, S749, S750, S751, S752, and S753). Thereafter, the same procedure is performed to the subscriber stations 34 and 35.

As described above, the system recovery time associated with the resetting of a transmission level can be shortened by transmitting a level difference for an arbitrary subscriber station to all subscriber stations at a link switching time using a broadcast address or multicast address.

Figure 16:
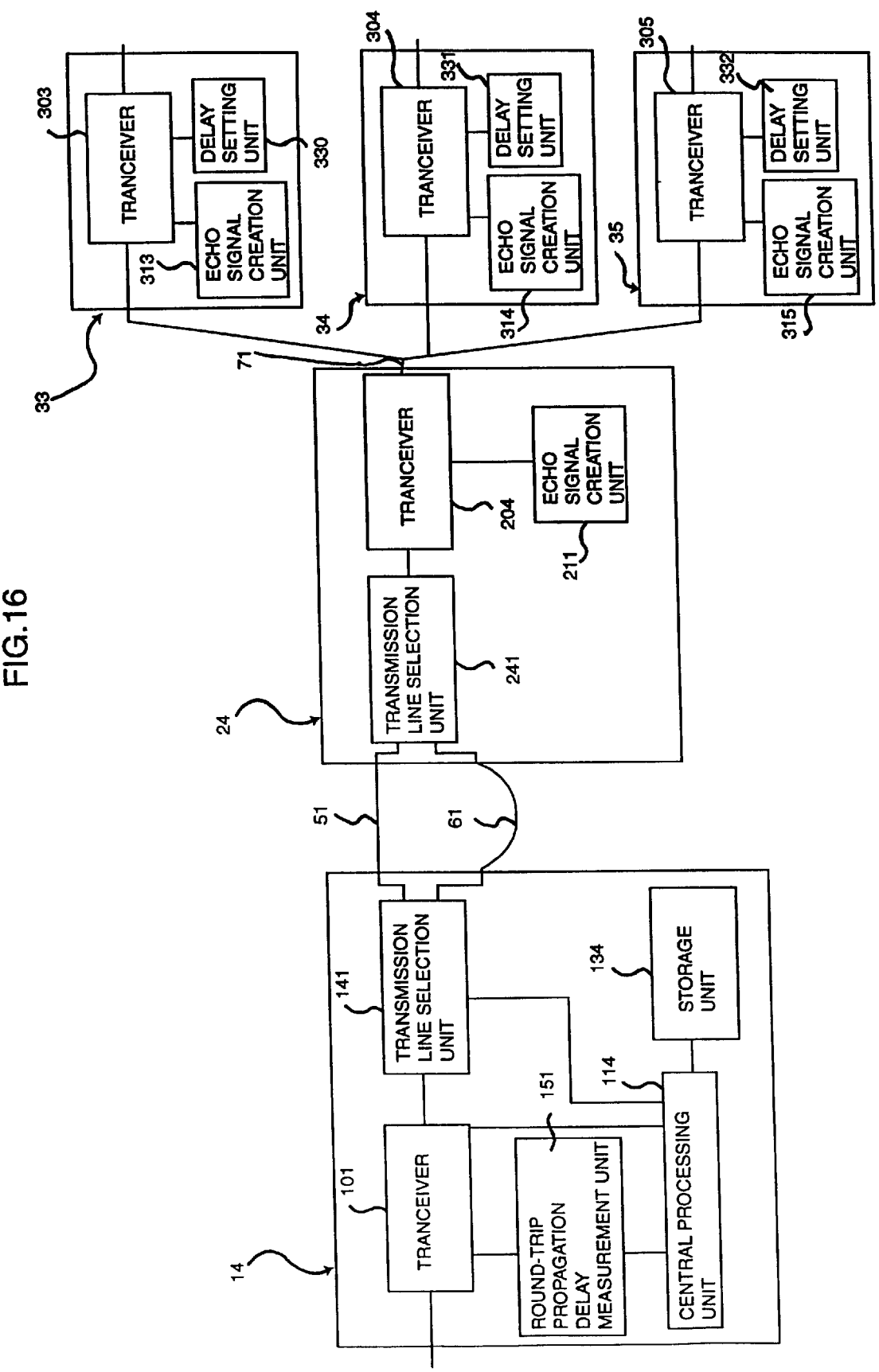
FIG. 16 is a block diagram illustrating the configuration of a system, which includes a center station, a relay station, and subscriber stations, for setting a transmission level, according to the eighth embodiment.

FIG. 16 is a block diagram illustrating the configuration of a system including the center station 14, the relay station 24 and the subscriber stations 33 to 35 for setting a transmission level, according to the eighth embodiment.

As to the working system relay transmission line 51 and the stand-by system relay transmission line 61 shown in FIG. 16, each function is similar to that in the first embodiment. The center station 14 consists of a tranceiver 101, a central processing unit 114, a round-trip propagation delay measurement unit 121, a storage unit 131, and a transmission line selection unit 141.

The central processing unit 114 creates a level measurement signal to the relay station 24 and the subscriber stations 33 to 35 and then outputs it to the tranceiver 101 and the receive level measurement unit 151. When receiving the receive level of an echo signal to be sent from the receive level measurement unit 151 to the relay station 24, the central processing unit 114 outputs it to the storage unit 134.

When receiving the receive level of an echo signal to be sent from the receive level measurement unit 151 to the subscriber stations, the central processing unit 114 calculates the transmission levels of the subscriber stations 33 to 35 and then outputs them to the storage unit 134. The central processing unit 114 also creates a transmission level setting signal to the subscriber stations 33 to 35 and then it to the tranceiver 101.

The receive level measurement unit 151 measures the receive level of an echo signal received by the relay station 24 or each of the subscriber stations 33 to 35 and then outputs it to the central processing unit 114. The storage unit 134 stores the transmission level for the subscriber stations 33 to 35 in operation input from the central processing unit 114 and the receive level of an echo signal for the relay station 24. The function of the transmission line selection unit 141 is the same as that in the sixth embodiment.

The relay station 24 consists of a tranceiver 204, an echo signal creation unit 211, and a transmission line selection unit 241. The tranceiver 204 relays a signal from the transmission line selection unit 241 to the subscriber system transmission line 71 and relays a signal from the subscriber system transmission line 71 to the transmission line selection unit 241.

The tranceiver 204 separates a level measurement signal transmitted to the relay station 24 from the signal input by the transmission line selection unit 241, outputs it to the echo signal creation unit 211, multiplexes an echo signal input from the echo signal creation unit 211 to the signal input from the subscriber system transmission line 71, and then outputs the result to the transmission line selection unit 241. When inputting a level measurement signal from the tranceiver 204, the echo signal creation unit 211 immediately creates an echo signal and then outputs it to the tranceiver 204. The function of the transmission selection unit 241 is identical to that in the sixth embodiment. The function of each of the subscriber stations 33 to 35 is identical to that in the sixth embodiment.

Figure 17:
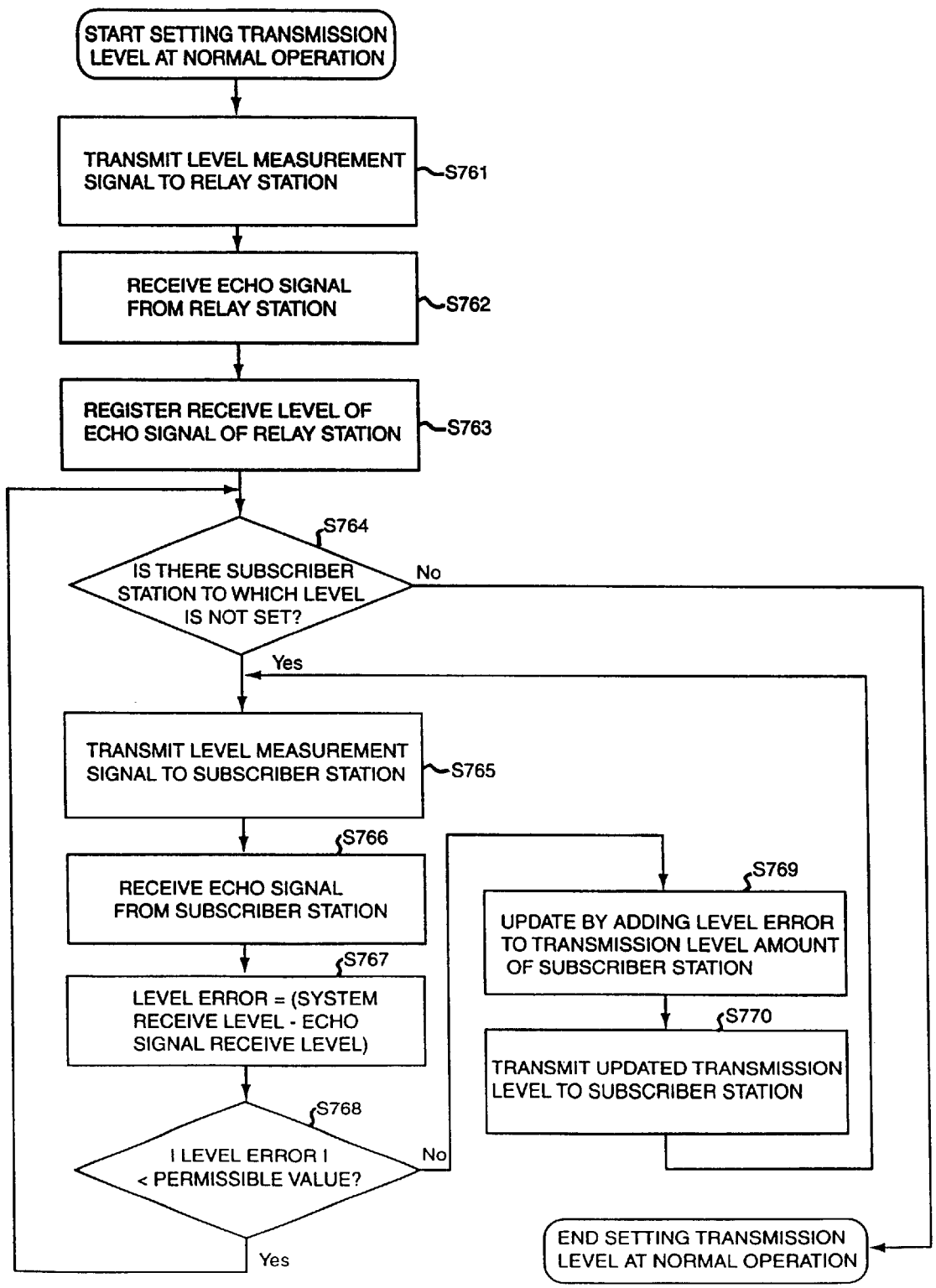
FIG. 17 is a flowchart illustrating the operational procedure of the center station for setting a transmission level at a normal operation time, according to the eighth embodiment.

FIG. 17 is a flowchart illustrating an operational procedure of the center station 14 for a transmission level at a normal operation time according to the eighth embodiment.

The center station 14 first transmits a level measurement signal to the relay station 24 (step S761) and then receives an echo signal from the relay station 24 to obtain the receive level thereof (step S762). Next, the storage unit 134 stores the receive level of the echo signal to be sent to the relay station 24. Thereafter, when a subscriber station to which a transmission level is not set is recognized, the transmission level setting is performed until no subscriber stations to which a transmission level is not set exist, according to the same procedure as that in the sixth embodiment shown in FIG. 13 (steps S763, S764, S765, S766, S767, S768, S769, and S770).

Figure 18:
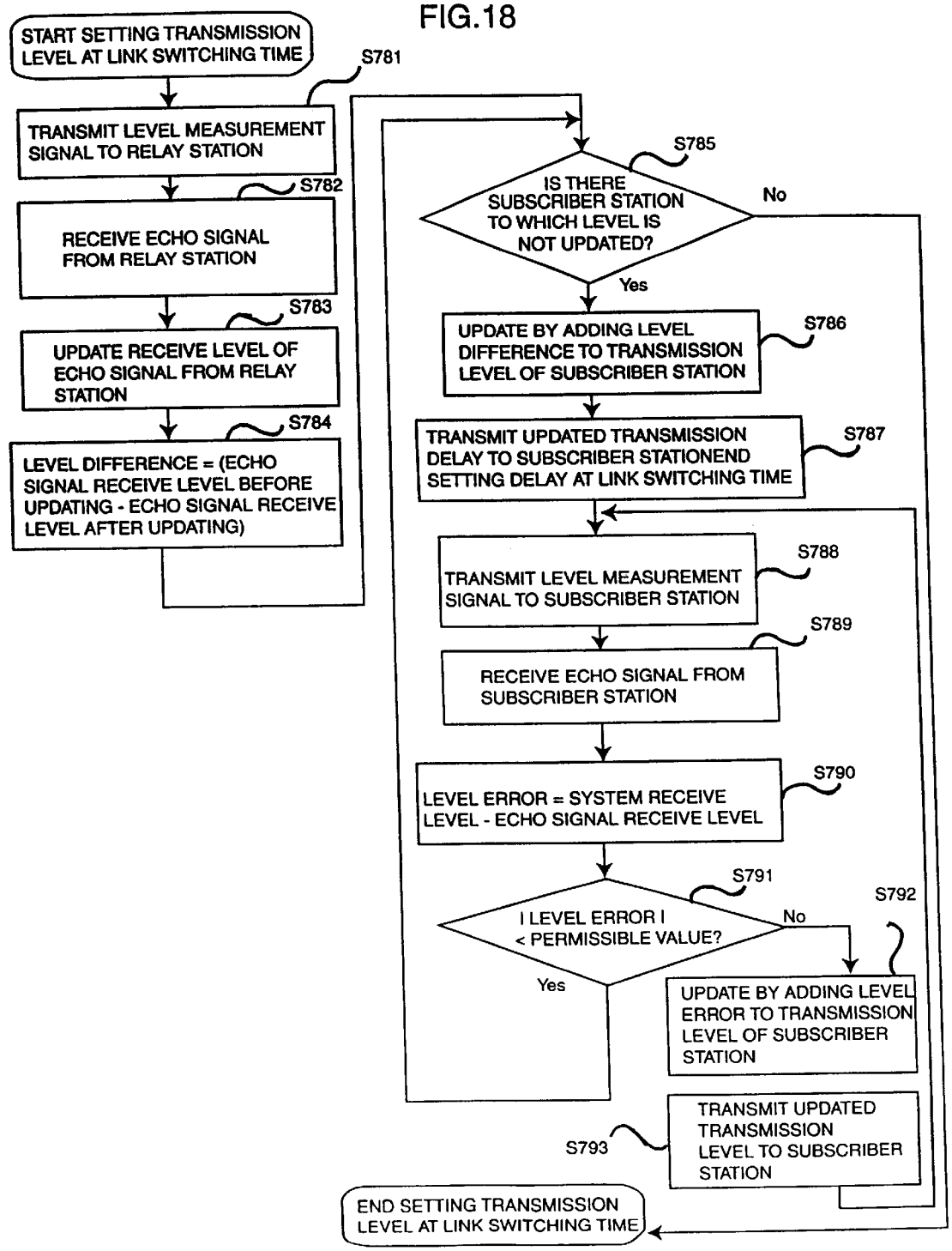
FIG. 18 is a flowchart illustrating the operational procedure of the center station for setting a transmission level at a link switching time, according to the eighth embodiment.

FIG. 18 is a flowchart illustrating an operational procedure of the center station 14 for setting a transmission level at a link switching time according to the eighth embodiment.

When a link switching operation occurs, the central processing unit 114 in the center station 14 creates a level measurement signal to the relay station 24 and then outputs it to the tranceiver 101. In response to an echo signal from the relay station 24, the tranceiver 101 in the center station 14 notifies the receive level measurement unit 151 of the event. The receive level measurement unit 151 inputs the receive level of the echo signal to be sent to the relay station 24 after the link switching operation.

The central processing unit 114 updates the receive level of the echo signal from the center station stored in the storage unit 134 (steps S781, S782, and S783) and then calculates the difference between the receive level of the echo signal before a link switching operation to be sent the relay station 24 and the receive level of the echo signal after the link switching operation to obtain a level difference (step S784). The central processing unit 114 updates the transmission level by adding the level difference to the transmission level of a subscriber station 33 stored in the storage unit 134.

Next, in order to update the internal transmission level of the subscriber station 33, the central processing unit 114 creates a transmission level setting signal and then outputs it to the subscriber station 33 via the tranceiver 101 (steps S784, S785, S786, and S787).

In order to ensure whether the transmission level setting signal has been properly received, the center station 14 transmits a level measurement signal to the subscriber station 33 (step S788) and then updates the transmission level until the receive error between the receive level of the echo signal and the system receive level becomes less than a permissible value, in a similar manner to that at the normal operation. The same process is performed to the subscriber stations 34 and 35, so that the transmission setting operation is completed (steps S789, S790, S791, S792, and S793).

In such an operation, the system recovery time at a link switching time can be shortened by updating the transmission levels of all the subscriber stations connected to the relay station 24 using a level difference for the relay station 24.

Figure 19:
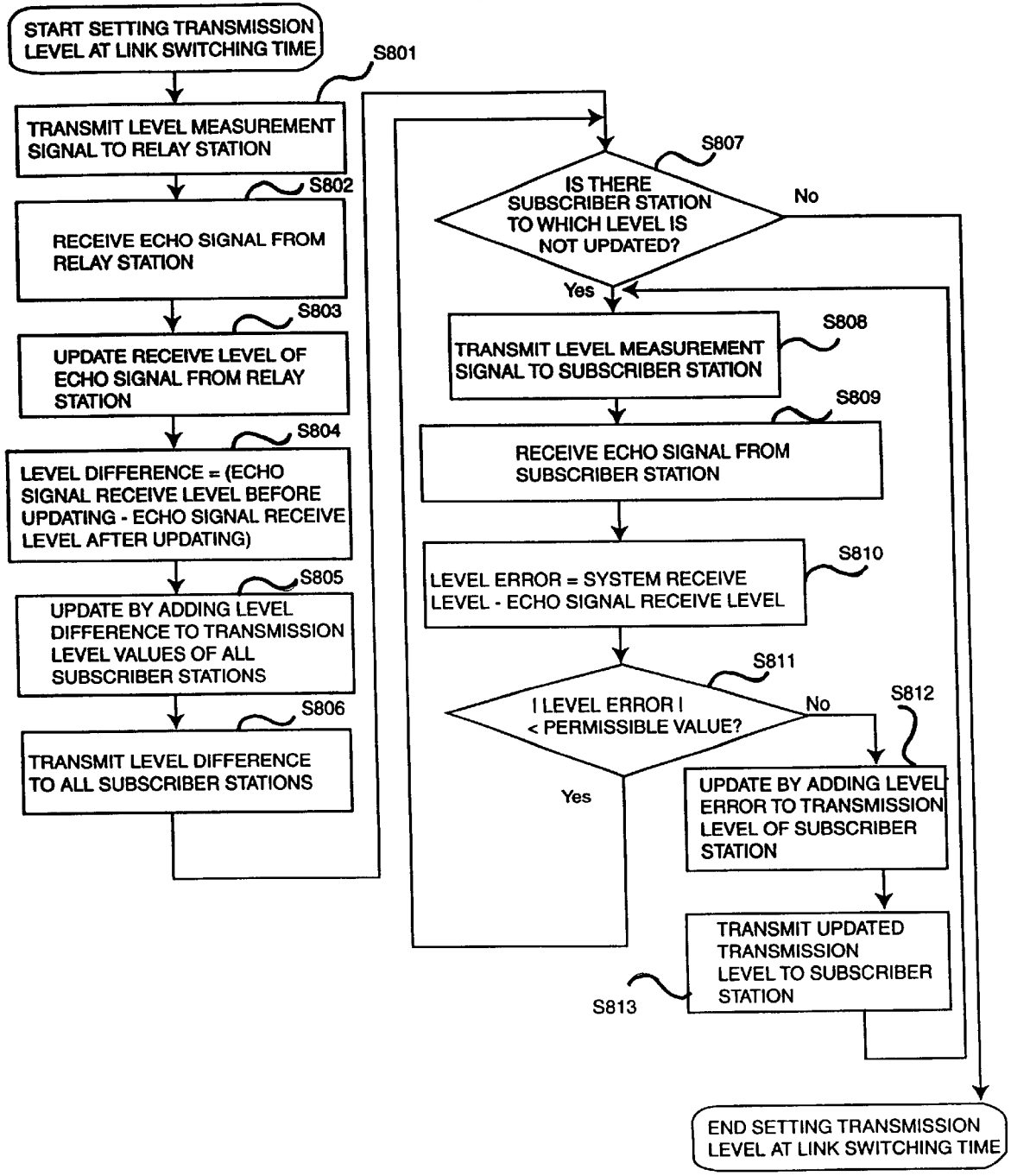
FIG. 19 is a flowchart illustrating the operational procedure of the center station for setting a transmission level at a link switching time, according to the ninth embodiment.

FIG. 19 is a flowchart illustrating an operational procedure of the center station 14 for setting a transmission level at a link switching time according to the ninth embodiment.

As to the center station 14, the relay station 24, and the subscriber stations 33 to 35, each configuration is similar to that of the corresponding element in the ninth embodiment. The operational flow of the center station 14 at a normal operation time is similar to that in the ninth embodiment. When a link switching operation occurs, the center station 14 measures the receive level of an echo signal to be used to the relay station to obtain a level difference (steps S801, S802, S803, and S804). Thereafter, the central processing unit 114 in the center station 14 updates the previous transmission level by updating the level difference to the transmission levels of all the subscriber stations connected to the relay station 24 stored in the storage unit 134 (step S805).

Next, the level difference is transmitted to all the subscriber stations connected to the relay station 24 (step S806). A broadcast address or multicast address is used as an address for identifying the destination of the level difference so as to be received by all the subscriber stations connected to the relay station 24. When the subscriber station 33 in the transmission level setting unit 330 receives the level difference, it updates the previous transmission level by adding the level difference of a transmission level. When the subscriber station 34 in the transmission level setting unit 331 receives the level difference, it updates the previous transmission level by adding the level difference of a transmission level. When the subscriber station 35 in the transmission level setting unit 332 receives the level difference, it updates the previous transmission level by adding the level difference of a transmission level.

Next, in order to ensure whether the subscriber station 33 has reset the transmission level, the central processing unit 114 in the center station 14 transmits a level measurement signal to the subscriber station 33. The central processing unit 114 receives an echo signal from the subscriber station 33. When the level error is more than a permissible value, the central processing unit 114 resets the transmission level. When the level error is less than a permissible value, the resetting of the transmission level to the subscriber station 33 is completed (steps S807, S808, S809, S810, S811, S812, and S813). Thereafter, the same process is performed to the subscriber stations 34 and 35.

As described above, the system recovery time associated with the transmission setting of a transmission value can be shortened by transmitting a level difference for the relay station to all the subscriber stations at a link switching time, using a broadcast address or multicast address.

Figure 20:
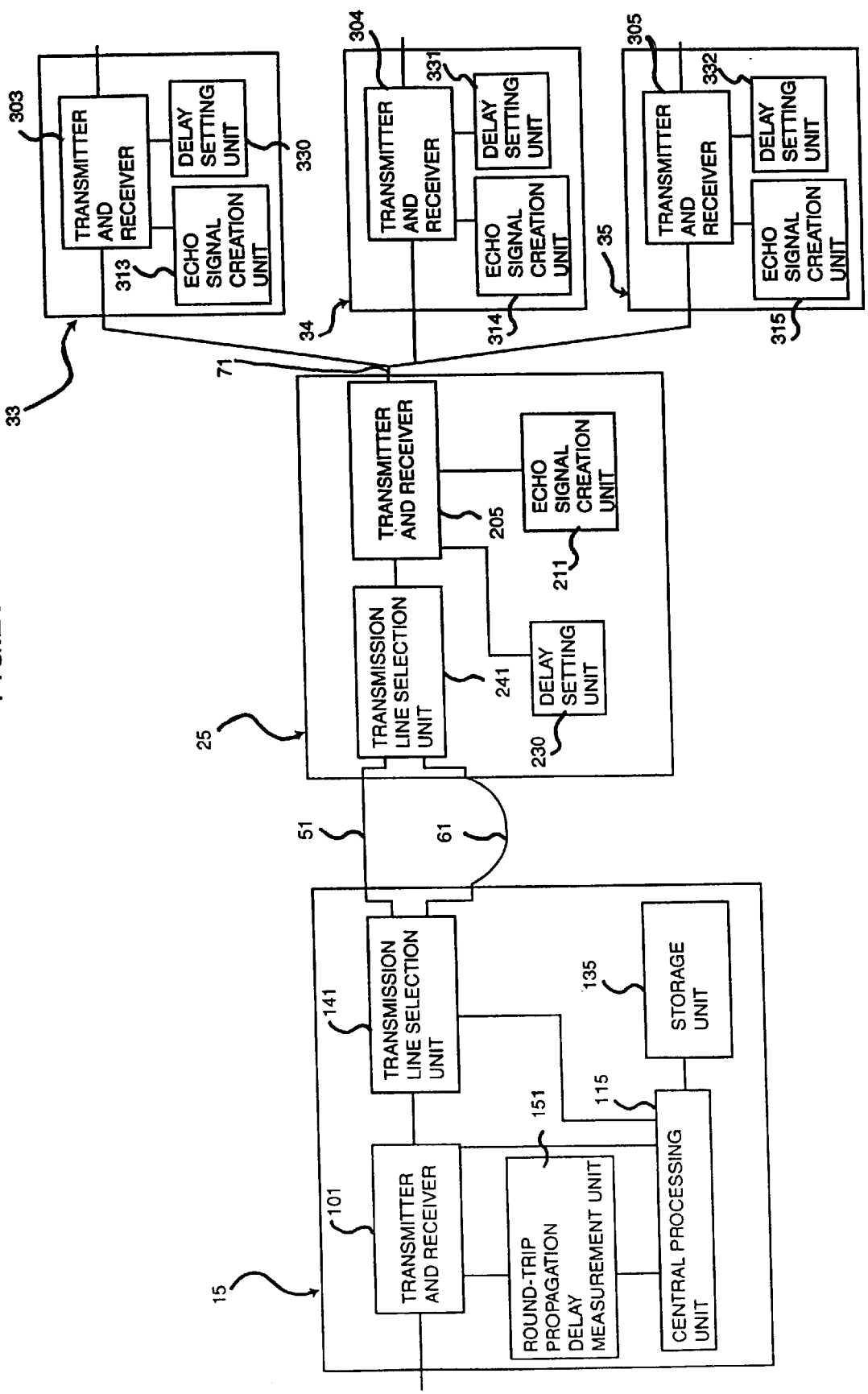
FIG. 20 is a block diagram illustrating the configuration of a system, which includes a center station, a relay station, and subscriber stations, for setting a transmission level, according to the tenth embodiment.

FIG. 20 is a block diagram illustrating the configuration of a system including the center station 15, the relay station 25, and the subscriber stations 33 to 35 for setting a transmission level, according to the tenth embodiment.

The functions of the subscriber stations 33 to 35, the working system relay transmission line 51 and the stand-by system transmission line 61 shown in FIG. 20 are similar to those of the corresponding elements in the sixth embodiment, respectively.

The center station 15 consists of a tranceiver 101, a central processing unit 115, a receive level measurement unit 151, a storage unit 135, and a transmission line selection unit 141. The function of the tranceiver 101 is similar to that in the sixth embodiment. The central processing unit 115 creates a level measurement signal to be sent to the relay station 25 and the subscriber stations 33 to 35 and then outputs it to the tranceiver 101 and the receive level measurement units 33 to 35. When receiving the receive level of an echo signal to be sent from the receive level measurement unit 51 to the relay station 25, the central processing unit 115 calculates a transmission level for the relay station 25 and outputs it into the storage unit 135. The central processing unit 115 further creates a transmission level setting signal to be sent to the relay station 25 and then outputs it to the tranceiver 101.

When receiving the receive level of an echo signal to be sent from the receive level measurement unit 151 to the subscriber stations 33 to 35, the central processing unit 115 calculates transmission levels of the subscriber stations 33 to 35, outputs them into the storage unit 135. The central processing unit 115 further creates a transmission level setting signal to be sent to the subscriber stations 33 to 35 and then outputs it to the tranceiver 101. The function of the receive level measurement unit 151 is similar to that in the fifth embodiment.

The storage unit 135 holds the transmission levels to the subscriber stations 33 to 35 in operation which are input from the central processing unit 115 as well as the receive level of an echo signal to the relay station 25. The function of the transmission line selection unit 141 is similar to that in the sixth embodiment.

The relay station 25 consists of a tranceiver 205, an echo signal creation unit 211, a transmission level setting unit 230, and a transmission line selection unit 241. The tranceiver 205 has the same function as that tranceiver 204 in the eighth embodiment. The tranceiver 204 also separates a transmission level setting signal transmitted to the relay station 25 from a signal input from the transmission line selection unit 241, outputs it to the transmission level setting unit 230, and varies the transmission level of a signal to be output to the transmission line selection unit 241 when a transmission level is received from the transmission level setting unit 230.

The transmission level setting unit 230 has the same function as the transmission level setting unit 330 in the subscriber station 33, the transmission level setting unit 331 in the subscriber station 34, or the transmission level setting unit 332 in the subscriber station 35. The transmission level setting unit 230 outputs a transmission level to be set to the tranceiver 205 based on a transmission level setting signal input from the tranceiver 205. The function of the echo signal creation unit 211 is similar to that in the six embodiment. The function of the transmission line selection unit is similar to as that in the six embodiment.

Figure 21:
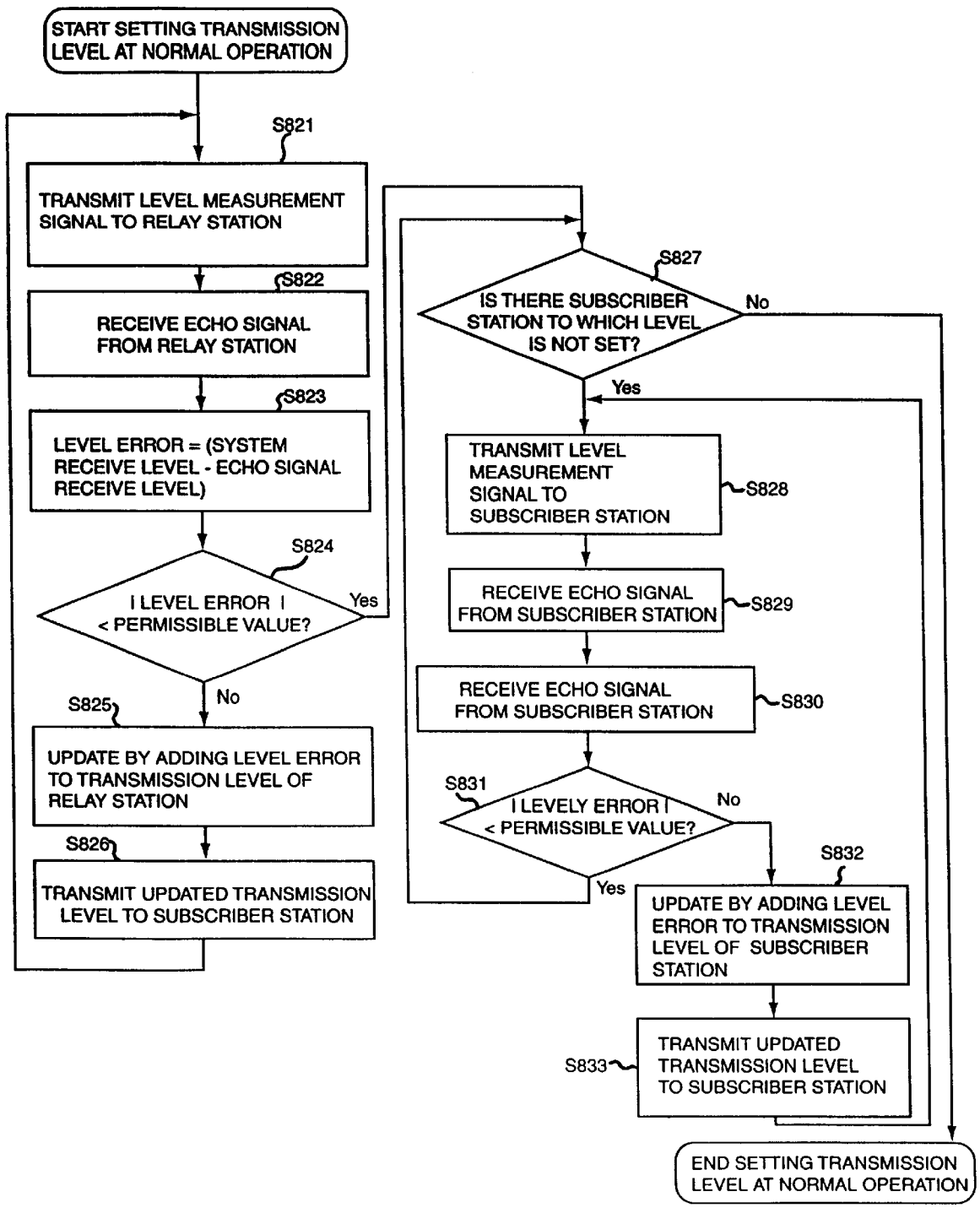
FIG. 21 is a flowchart illustrating the operational procedure of the center station for setting a transmission level at a normal operation time, according to the tenth embodiment.

FIG. 21 is a flowchart illustrating an operational procedure of the center station 15 for setting a transmission level at a normal operation, according to the tenth embodiment.

The center station 15 first transmits a level measurement signal to the relay station 25 (step S821) and then receives an echo signal from the relay station 25, thus obtaining the receive level of the echo signal to the relay station 25 (step S822).

The central processing unit 115 in the center station 15 subtracts the receive level of an echo signal to be sent the relay station 25 from the system receive level, updates by adding a level error to the transmission level of the relay station 25 stored in the storage unit 135 when the level error is more than a permissible value, and then transmits a transmission level setting signal to the relay station 25 (steps S823, S824, S825, and S826).

Thereafter, the level measurement setting is performed to the relay station 25 until a level error becomes less than a permissible value. When the transmission level setting operation to the relay station 25 is completed, a transmission level setting is performed to a subscriber station to which a transmission level is not set, according to the same procedure as that in the sixth embodiment (steps S827, S828, S829, S830, S832, and S833).

Figure 22:
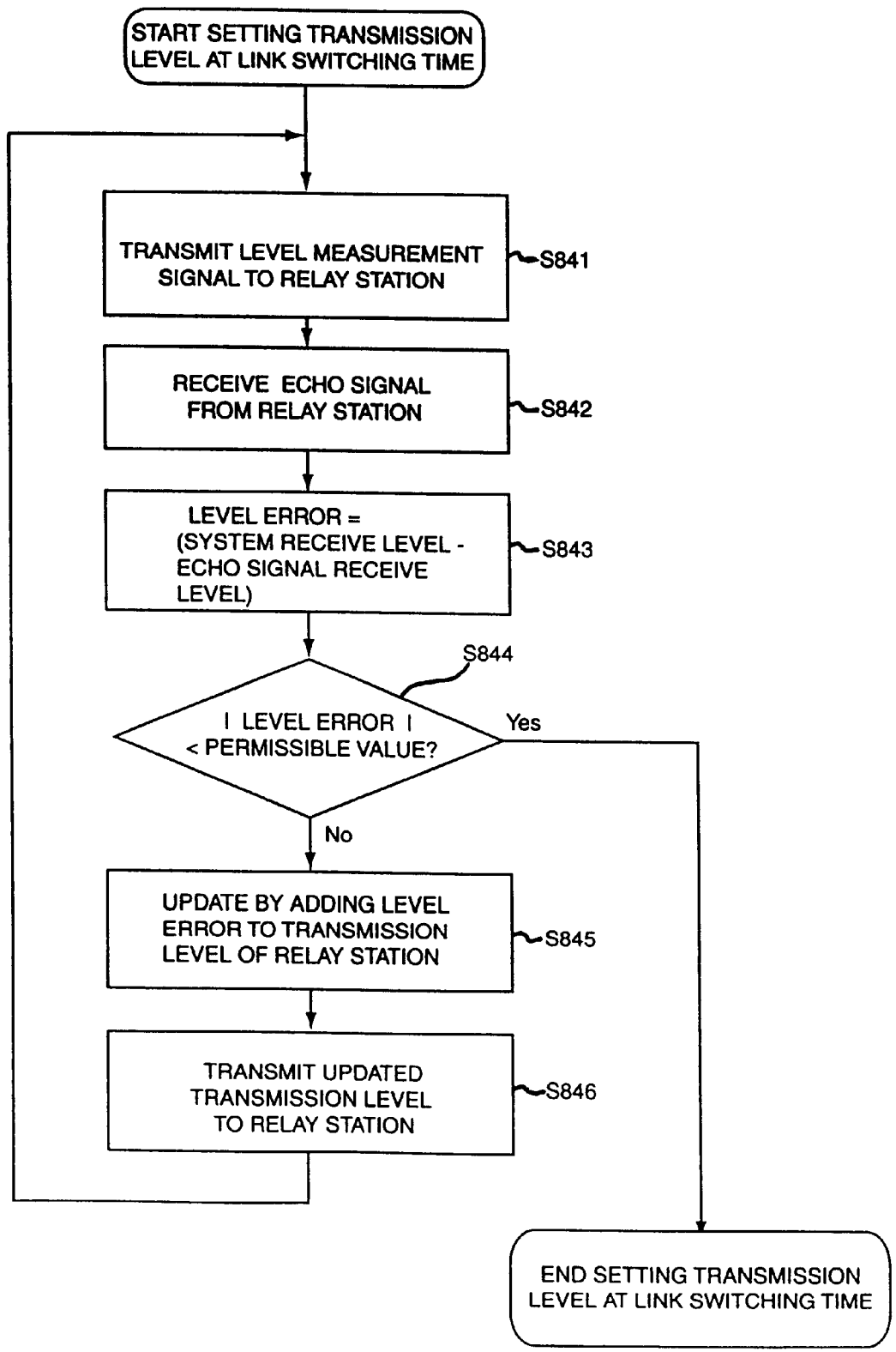
FIG. 22 is a flowchart illustrating the operational procedure of the center station for setting a transmission level at a link switching time, according to the tenth embodiment.

FIG. 22 is a flowchart illustrating an operational procedure of the center station 15 for setting a transmission level at a link switching time according to the tenth embodiment.

The center station 15 first transmits a level measurement signal to the relay station 25 (step S841) and then receives an echo signal from the relay station 25, thus obtaining the receive level thereof (step S842). The central processing unit 115 in the center station 15 subtracts the receive level of the echo signal to be sent to the relay station 25 from the system receive level to obtain a level error (step S843). When the level error is more than a permissible value, the central processing unit 115 updates the transmission level by adding the level error to the transmission level of the relay station 25 stored in the storage unit 135 and then transmits a transmission level setting signal to the relay station 25.

Thereafter, the central processing unit 115 transmits a level measurement signal until the level error reaches less than a permissible value, and then sets the transmission level at a link switching time (steps S844, S845, and S846).

According to the present embodiment, compared with the resetting of a transmission level to all the subscriber stations, since the delay adjusting function added to the relays station can absorb a change in the setting of a transmission level with a change in a relay station transmission line, the system recovery time can be shortened.

Figure 23:
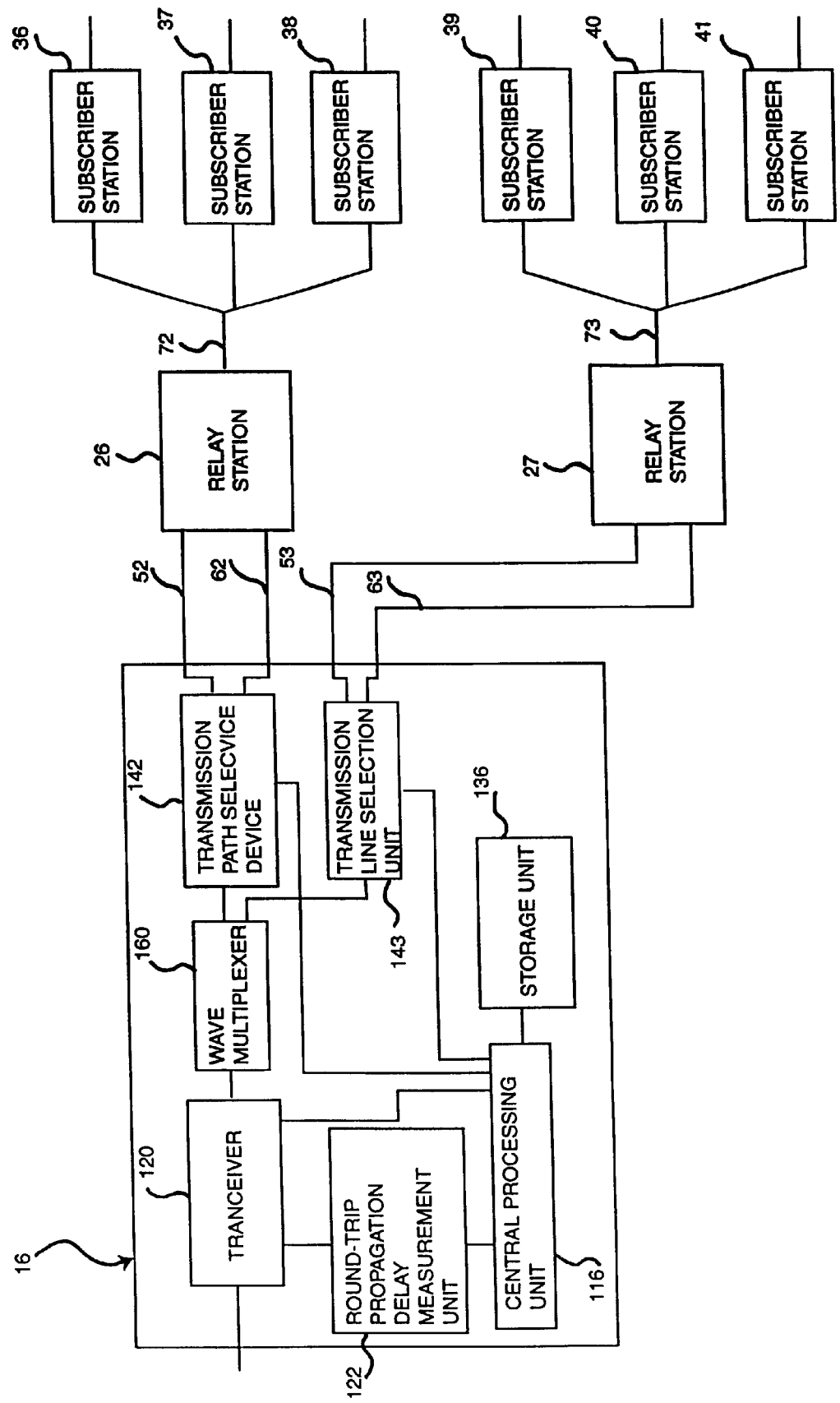
FIG. 23 is a block diagram illustrating the configuration of a system, which includes a center station, a relay station, and subscriber stations, for setting a delay, according to the eleventh embodiment.

FIG. 23 is a block circuit diagram illustrating the configuration of a system, including the center station 16, the relay stations 26 and 27, and the subscriber stations 36, 37, 38, 39, 40, and 41, for setting a delay, according to the eleventh embodiment.

Referring to FIG. 23, the center station 16 is connected to the relay station 26 via the working system relay transmission line 52 and the stand-by system relay transmission line 62. The center station 16 is connected to the relay station 27 via the working system relay transmission line 53 and the stand-by relay transmission line 63.

The subscriber transmission line 72 connects the relay station 26 to the subscriber stations 36 to 38. The subscriber transmission line 73 connects the relay station 27 to the subscriber stations 39 to 41. The up-stream line which transmits data from a subscriber station to the center station is shared with the subscriber stations 36 to 41 by the time division multiplex system.

The center station 16 consists of a tranceiver 102, a central processing unit 116, a round-trip propagation delay measurement unit 122, a storage unit 136, transmission line selection units 142 and 143, and a wave multiplexer (synthesizer) 160.

The functions of the tranceiver 102, the round-trip propagation delay measurement unit 122, and the transmission line selection units 142 and 143 in the center station 16 are similar to those of the corresponding elements in the first embodiment, respectively. The transmission line selection unit 142 outputs a link switching notification signal on the working system relay transmission line 52 or the stand-by system relay transmission line 62 to the central processing unit 116. The transmission line selection unit 143 outputs a link switching notification signal on the working system relay transmission line 53 or the stand-by system relay transmission line 63 to the central processing unit 116.

The central processing unit 116 respectively receives the signal from the transmission line selection unit 142 and the signal from the transmission line selection unit 143.

The storage unit 136 has the function of the storage unit 130 in the first embodiment and further stores connection information regarding that the relay station 26 is associated with the subscriber stations 36, 37, and 38 and connection information that the relay station 27 is associated with the subscriber stations 39, 40, and 41.

Moreover, the wave multiplexer 160 in the center station 17 branches the transmission signal input from the tranceiver 103 to the transmission line selection units 144 and 145 and combines (synthesizes) the receive signal input from the transmission selection units 144 with the receive signal input from the transmission selection unit 145, thus outputting the result to the tranceiver 103.

The function of each of the relay stations 26 and 27 is the same as that of the relay station 20 in the first embodiment. The functions of the subscriber stations 36 to 41 are the same to those of the subscriber stations 30 to 32 in the first embodiment, respectively. When the linking is switched to the stand-by system relay transmission line 62 because of a failure in the working system relay transmission line 52, the center station 16 transmits a round-trip propagation delay measurement signal to only the arbitrary subscriber station connected to the relay station 26 and then resets the transmission delay according to a similar procedure to that in the first embodiment.

As described above, compared with the case where the transmission delay is reset to the subscriber stations associated with the relay stations 26 and 27 at a switching time, the system recovery time can be reduced by resetting the transmission delay to only the subscriber stations 36, 27, and 38 associated with the relay station 26 to which the link switching has occurred.

Figure 24:
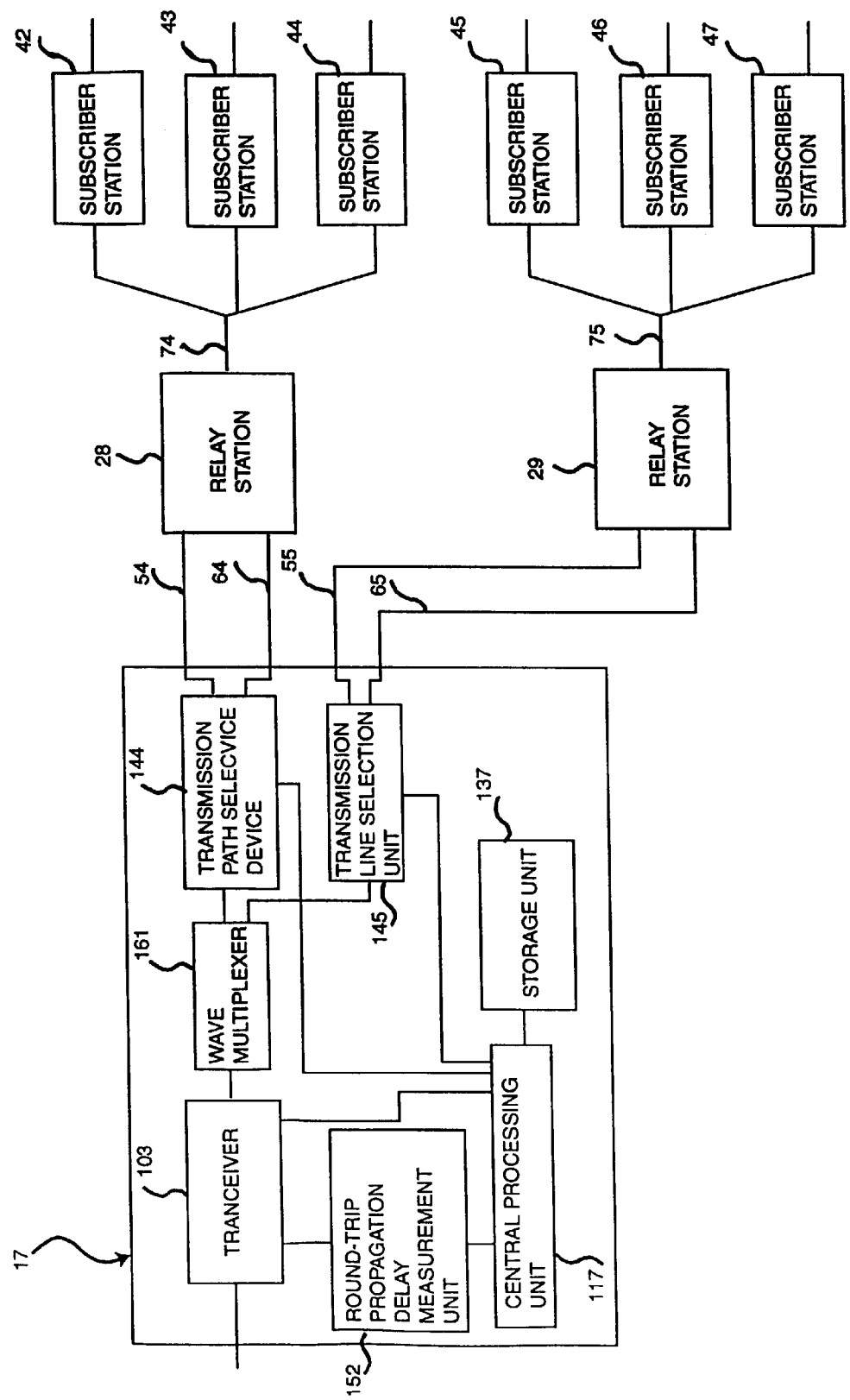
FIG. 24 is a block diagram illustrating the configuration of a system, which includes a center station, a relay station, and subscriber stations, for setting a transmission level, according to the twelfth embodiment.

FIG. 24 is a block diagram illustrating the configuration of a system, including the center station 17, the relay stations 28 and 29, and the subscriber stations 42, 43, 44, 45, 46, and 47, for setting a transmission level, according to the twelfth embodiment.

Referring to FIG. 24, the center station 17 is connected to the relay station 28 via the working system relay transmission line 54 and the stand-by system relay transmission line 64. The center station 17 is connected to the relay station 29 via the working system relay transmission line 55 and the stand-by system relay transmission line 65. The subscriber transmission line 74 connects the relay station 28 to the subscriber stations 42 to 44. The subscriber transmission line 75 connects the relay station 29 to the subscriber stations 45 to 47.

The center station 17 consists of a tranceiver 103, a central processing unit 117, a receive level measurement unit 152, a storage unit 137, transmission line selection units 144 and 145, and a wave multiplexer (synthesizer) 161.

The tranceiver 103, the receive level measurement unit 152, and the transmission line selection units 144 and 145 in the center station 17 have the same functions as the corresponding elements in the sixth embodiment, respectively. The transmission line selection unit 144 outputs a signal for notifying a link switching operation between the working system relay transmission line 54 and the working system relay transmission line 64, to the central processing unit 117.

The transmission line selection unit 145 outputs a signal for notifying a link switching operation between the working system relay transmission line 55 and the working system relay transmission line 65, to the central processing unit 117. The central processing unit 117 receives the signal from the transmission line selection unit 144 and the signal from the transmission line selection unit 145, respectively.

The storage unit 137 has the function of the storage unit 133 in the sixth embodiment and stores connection information regarding that the subscriber stations 42 to 44 are associated with the relay station 28 and connection information regarding that subscriber stations 45 to 47 are associated with the relay station 29.

Moreover, the wave multiplexer 161 in the center station 17 branches a transmission signal input from the tranceiver 103 to the transmission line selection units 144 and 145 and combines the receive signal input from the transmission line selection unit 144 with the receive signal input from the transmission line selection unit 145, thus outputting the result to the tranceiver 103.

Each of the relay stations 28 and 29 has the same function as the relay station 23 in the sixth embodiment. The subscriber stations 42 to 47 have the same functions as the subscriber stations 33 to 35 in the sixth embodiment, respectively.

When the linking route is switched to the stand-by system relay transmission line 64 after a failure in the working system relay transmission line 54, the center station 17 transmits a round-trip propagation delay measurement signal to only an arbitrary subscriber station connected to the relay station 17 and then resets the transmission level according to the same procedure in the sixth embodiment.

In such an operation, compared with the case where a transmission delay is reset to the subscriber stations associated with the relay stations 28 and 29 at a link switching time, the system recovery time can be shortened by resetting the transmission delay to only the subscriber stations 42 to 44 associated with the relay station 28 in a failure state.

As clearly understood from the above description, according to the bidirectionsl communication system of the present invention, the center station measures the round-trip propagation delay of a signal when a subscriber station starts its operation, and sets the transmission delay of the subscriber station so as to equalize the round-trip propagation delay measured to the subscriber station to a system delay of a fixed value.

When the linking route is switched from a working system to a stand-by system because of a failure in the relay transmission line, the center station measures the round-trip propagation delay of a signal to a subscriber station after the link switching operation and then resets transmission delays of all subscriber stations connected to the relay station at a time, based on the difference between the measured round-trip propagation delay and the round-trip propagation delays of signals to the subscriber stations before the link switching operation.

As a result, in two-way CATV networks, passive optical star networks, and the like, even when a link switching operation occurs between the center station and the relay station while adjusting the transmission delay or transmission level before a subscriber station's operation, the system recovery time is shortened, so that the transmission efficiency can be improved.

The entire disclosure of Japanese Patent Application No. 9-087056 filed on Mar. 4, 1997 including specification, claims, drawing and summary are incorporated herein by reference in its entirety.

What is claimed is:

1. A two-way communication system comprising:
   a center station;
   subscriber stations each for mutually exchanging signals with said center station;
   a relay station for relaying signals between said center station and said subscriber stations;
   a relay transmission line connected between said center station and said relay station and duplex systematized by a working system and a stand-by system; and
   a subscriber transmission line connected between said relay station and said subscriber stations,
      wherein said center station measures a round-trip propagation delay when a subscriber station starts its operation and then sets a transmission delay of said subscriber station so as to equalize the round-trip propagation delay measured to said subscriber station to a fixed system delay; and
      wherein said center station measures a round-trip propagation delay of a subscriber station after a link switching operation when a link switching operation from a working system to a stand-by system occurs due to a failure in said relay transmission line, and resets transmission delays of all subscriber stations connected to said relay station based on a difference between the measured delay and a round-trip propagation delay of a signal to said subscriber station before said link switching operation.

2. The two-way communication system of claim 1, wherein said center station is connected to plural relay stations via plural relay transmission lines, and wherein all subscriber stations connected to said plural relay stations share a line based on a time division multiplex system, and wherein when a link switching operation from said working system to said stand-by system occurs due to a failure of one of said plural relay transmission lines or when a link switching operation from said stand-by system to said working station occurs due to a recovery of a failed one of said plural relay transmission lines, said center station measures a round-trip propagation delay of a signal to a subscriber station connected to the relay station involved in the link switching operation and resets transmission delays of all subscriber stations connected to the relay station involved in the link switching operation based on the difference between the measured delay and a round-trip propagation delay to said subscriber station before the link switching operation.

3. A two-way communication system comprising:
   a center station;
   subscriber stations each for mutually exchanging signals with said center station;
   a relay station for relaying signals between said center station and said subscriber stations;
   a relay transmission line connected between said center station and said relay station and duplex systematized by a working system and a stand-by system; and
   a subscriber transmission line connected between said relay station and said subscriber stations,
      wherein said center station measures a round-trip propagation delay when a subscriber station starts its operation and then sets a transmission delay of said subscriber station so as to equalize the round-trip propagation delay measured to said subscriber station to a fixed system delay;
      wherein said center station measures a round-trip propagation delay of a signal to said relay station when said relay station starts its operation; and
      wherein when a link switching operation from said working system to said stand-by system occurs due to a failure of said relay transmission line or when a link switching operation from said stand-by system to said working system occurs due to a recovery of a failed relay transmission line, said center station measures a round-trip propagation delay of a signal to said relay station after the link switching operation and then resets transmission delays of all subscriber stations connected to said relay station based on a difference between said measured delay and a round-trip propagation delay to a signal to said relay station before the link switching operation.

4. The two-way communication system of claim 3, wherein said center station is connected to plural relay stations via plural relay transmission lines, and wherein all subscriber stations connected to said plural relay stations share a line by a time division multiplex system, and wherein when a link selecting operation from said working system to said stand-by system occurs due to a failure of one of said plural relay transmission lines or when a link switching operation from said stand-by system to said working system occurs due to a recovery of a failed one of said plural relay transmission lines, said center station measures a round-trip propagation delay of a signal to a relay station involved in the link switching operation and resets transmission delays of all said subscriber stations connected to the relay station involved in the link switching operation, based on the difference between said measured delay and a round-trip propagation delay of a signal to said relay station before the link switching operation.

5. The two-way communication system of claim 3, wherein the transmission delay of said relay station is set so as to equalize said round-trip propagation delay measured to said relay station to a relay station system delay of a fixed value, and wherein when a link switching operation from said working system to said stand-by station occurs due to a failure of said relay transmission line, or when a link switching operation from said stand-by system to said working system occurs due to a recovery of a failed relay transmission line, said center station measures a round-trip propagation delay of a signal to said relay station after the link switching operation and then resets the transmission delay of said relay station so as to equalize transmission delays of all subscriber stations connected to said relay station to those before a link switching operation based on the difference between the measured round-trip propagation delay and a round-trip propagation delay of a signal to said relay station before the link switching operation.

6. The two-way communication system of claim 5, wherein said center station is connected to plural relay stations via plural relay transmission lines, and wherein all subscriber stations connected to said plural relay stations share a line based on a time division multiplex system, and wherein when a link switching operation from said working system to said stand-by system occurs due to a failure of one of said plural relay transmission lines or when a link switching operation from said stand-by system to said working system occurs due to a recovery of a failed one of said plural relay transmission lines, said center station measures a round-trip propagation delay of a signal to said relay station after said link switching operation and resets the transmission delay of the relay station involved in said link switching operation so as to equalize transmission delays of all said subscriber stations connected to the relay station involved in said link switching operation to the transmission delay before said link switching operation, based on the difference between said measured round-trip propagation delay and the round-trip propagation delay of a signal to said relay station before the link switching operation.

7. A two-way communication system comprising:
a center station;
subscriber stations each for mutually exchanging signals with said center station;
a relay station for relaying signals between said center station and said subscriber stations;
a relay transmission line connected between said center station and said relay station and duplex systematized by a working system and a stand-by system; and
a subscriber transmission line connected between said relay station and said subscriber stations,
wherein said center station measures a receive level when a subscriber station starts its operation and then sets the transmission level of said subscriber station so as to equalize the receive level measured to said subscriber station to a fixed system receive level; and
wherein when a link switching operation from said working system to said stand-by system occurs due to a failure of said relay transmission line or when a link switching operation from said stand-by system to said working system occurs due to a recovery of a failed relay transmission line, said center station resets transmission level set values of all subscriber stations connected to said relay station based on a difference between the measured receive level and a receive level of a signal to a subscriber station after the link switching operation.

8. The two-way communication system of claim 7, wherein said center station is connected to plural relay stations via plural relay transmission lines, and wherein all subscriber stations connected to said plural relay stations share a line based on a time division multiplex system, and wherein when said link switching operation from said working system to said standby system occurs due to a failure of one of said plural relay transmission lines or when a link switching operation from said stand-by system to said working station occurs due to a recovery of a failed one of said plural relay transmission lines, said center station measures a receive level of a signal to a subscriber station connected to a relay station involved in the link switching operation and resets transmission levels of all subscriber stations connected to the relay station involved in the link switching operation based on a difference between the measured receive level and a receive level of a signal to said subscriber station before the link switching operation.

9. A two-way communication system comprising:
a center station;
subscriber stations each for mutually exchanging signals with said center station;
a relay station for relaying signals between said center station and said subscriber stations;
a relay transmission line connected between said center station and said relay station and duplex systematized by a working system and a stand-by system; and
a subscriber transmission line connected between said relay station and said subscriber stations,
wherein said center station measures a receive level when a subscriber station starts its operation and then sets the transmission level of said subscriber station so as to equalize the receive level measured to said subscriber station to a fixed system receive level;
wherein said center station measures a receive level of a signal to said relay station when said relay station starts its operation; and
wherein when a link switching operation from said working system to said stand-by system occurs due to a failure of said relay transmission line or when a link switching operation from said stand-by system to said working system occurs due to a recovery of a failed relay transmission line, said center station measures a receive level of a signal to the relay station after said link switching operation and then resets transmission level set values of all subscriber stations connected to said relay station based on a difference between the measured receive level and a receive level of a signal to the subscriber station after the link switching operation.

10. The two-way communication system of claim 9, wherein said center station is connected to plural relay stations via plural relay transmission lines, and wherein all subscriber stations connected to said plural relay stations share a line based on a time division multiplex system, and wherein when a link switching operation from said working system to said stand-by system occurs due to a failure of one of said plural relay transmission lines or when a link switching operation from said stand-by system to said working station occurs due to a recovery of a failed one of said plural relay transmission lines, said center station measures a receive level of a signal to a relay station involved in the link switching operation and then resets transmission level set values of all subscriber stations connected to the relay station involved in the link switching, based on a difference between the measured receive level and a receive level of a signal to said relay station before the link switching operation.

11. The two-way communication system of claim 9, wherein the transmission level of said relay station is set so as to equalize the receive level of the signal measured to said relay station to a system receive level of a fixed value, and wherein when a link switching operation from said working system to said stand-by system occurs due to a failure of a relay transmission line or when a link switching operation from said stand-by system to said working system occurs due to a recovery of a failed relay transmission line, said center station measures a receive level of a signal to a relay station after a link switching operation and then resets a transmission level set value of said relay station so as to equalize transmission levels of all subscriber stations connected to the relay station to the transmission level before the link switching operation, based on a difference between the measured receive level and a receive level of a signal to said relay station before the link switching operation.

12. The two-way communication system of claim 11, wherein said center station is connected to plural relay stations via plural relay transmission lines, and wherein all subscriber stations connected to said plural relay stations share a line based on a time division multiplex system, and wherein when a link switching from said working system to said stand-by system occurs due to a failure of one of said plural relay transmission lines or when a link switching operation from said stand-by system to said working station occurs due to a recovery of a failed one of said plural relay transmission lines, said center station measures a receive level of a signal to a relay station after the link switching operation and then resets a transmission level set value of a relay station involved in the link switching operation so as to equalize transmission levels of all subscriber stations connected to the relay station to the transmission level before the link switching operation, based on a difference between the measured receive level and a receive level of a signal to said relay station before the link switching operation.

13. A method of setting a delay in a center station comprising the steps of:
 measuring a round-trip propagation delay when a subscriber station starts its operation and then sets a transmission delay of said subscriber station so as to equalize the round-trip propagation delay measured to said subscriber station to a fixed system delay;
 measuring a round-trip propagation delay of a subscriber station after a link switching operation when a link switching operation from a working system to a stand-by system occurs due to a failure in a relay transmission line; and
 resetting transmission delays of all subscriber stations connected to said relay station based on a difference between the measured delay and a round-trip propagation delay of a signal to said subscriber station before said link switching operation.

14. A method of setting a delay in a center station comprising the steps of:
 measuring a round-trip propagation delay when a subscriber station starts its operation and then sets a transmission delay of said subscriber station so as to equalize the round-trip propagation delay measured to said subscriber station to a fixed system delay;
 measuring a round-trip propagation delay of a signal to a relay station when said relay station starts its operation;
 measuring a round-trip propagation delay of a signal to said relay station after the link switching operation when a link switching operation from a working system to a stand-by system occurs due to a failure of a relay transmission line or when a link switching operation from a stand-by system to said working system occurs due to a recovery of a failed relay transmission line; and
 then resetting transmission delays of all subscriber stations connected to said relay station based on a difference said measured delay and a round-trip propagation delay to a signal to said relay station before the link switching operation.

15. A method of setting a transmission level in a center station comprising the steps of:
 measuring a receive level when a subscriber station starts its operation;
 setting the transmission level of said subscriber station so as to equalize the receive level measured to said subscriber station to a fixed system receive level; and
 resetting transmission level set values of all subscriber stations connected to said relay station based on a difference between the measured receive level and a receive level of a signal to a subscriber station after the link switching operation when a link switching operation from a working system to a stand-by system occurs due to a failure of a relay transmission line or when a link switching operation from said stand-by system to said working system occurs due to a recovery of a failed relay transmission line.

16. A method of setting a transmission level in a center station comprising the steps of:
 measuring a receive level when a subscriber station starts its operation;
 setting the transmission level of said subscriber station so as to equalize the receive level measured to said subscriber station to a fixed system receive level;
 measuring a receive level of a signal to a relay station after said link switching operation when a link switching operation from a working system to a stand-by system occurs due to a failure of a relay transmission line or when a link switching operation from said stand-by system to said working system occurs due to a recovery of a failed relay transmission line; and
 then resetting transmission level set values of all subscriber stations connected to said relay station based on a difference between the measured receive level and a receive level of a signal to the subscriber station after the link switching operation.

\* \* \* \* \*